(12) United States Patent
Hirota et al.

(10) Patent No.: US 6,810,911 B2
(45) Date of Patent: Nov. 2, 2004

(54) FOUR-WAY SWITCHING VALVE

(75) Inventors: Hisatoshi Hirota, Tokyo (JP); Katsumi Koyama, Tokyo (JP)

(73) Assignee: TGK Co., Inc., Tokyo (JP)

( * ) Notice: Subject to any disclaimer, the term of this patent is extended or adjusted under 35 U.S.C. 154(b) by 120 days.

(21) Appl. No.: 10/357,891

(22) Filed: Feb. 4, 2003

(65) Prior Publication Data

US 2003/0159739 A1 Aug. 28, 2003

(30) Foreign Application Priority Data

Feb. 14, 2002 (JP) ........................................ 2002-036561

(51) Int. Cl.[7] ............................................. F16K 11/04
(52) U.S. Cl. ............................. 137/625.43; 137/625.49
(58) Field of Search ....................... 137/625.26, 625.43, 137/625.49

(56) References Cited

U.S. PATENT DOCUMENTS

| | | | |
|---|---|---|---|
| 4,469,134 A | 9/1984 | Kanai et al. | |
| 4,976,286 A | 12/1990 | Holborow et al. | |

FOREIGN PATENT DOCUMENTS

| | | | |
|---|---|---|---|
| EP | 0 927 846 A1 | 7/1999 | |
| EP | 1 061 314 A2 | 12/2000 | |

OTHER PUBLICATIONS

Abstract of Japanese Publication 08219308 Published Aug. 30, 1996.
Abstract of Japanese Publication 08226730 Published Sep. 3, 1996.
Abstract of Japanese Publication 2002372160 Published Dec. 26, 2002.

*Primary Examiner*—Gerald A. Michalsky
(74) *Attorney, Agent, or Firm*—Patterson, Thuente, Skaar & Christensen, P.A.

(57) ABSTRACT

A four-way switching valve includes a first three-way switching valve having a valve element for connecting a port B to a port A, or to a port D via a sleeve, in a switching manner; a second three-way switching valve having a valve element for connecting a port C to the port A, or to the port D, in a switching manner; and a piston for actuating these three-way switching valves. The three-way valves and piston are coaxially arranged within a hollow cylindrical body. A three-way solenoid valve introduces high pressure into a pressure chamber on the upper side of the piston to actuate the valve elements held on the sleeve downward, while the upward actuation is effected with a driving force produced by reducing the pressure in the pressure chamber and configuring guides to have a larger pressure-receiving area than that of a guide.

18 Claims, 17 Drawing Sheets

FOUR-WAY SWITCHING VALVE

CROSS-REFERENCES TO RELATED APPLICATIONS, IF ANY

This application claims priority of Japanese Application No. 2002-036561 filed Feb. 14, 2002 and entitled "Four-Way Switching Valve".

BACKGROUND OF THE INVENTION (1) Field of the Invention

This invention relates to a four-way switching valve, and more particularly to a four-way switching valve which carries out switching of refrigerant lines e.g. in a heat pump-type heating and cooling system for an automotive vehicle when the system is switched between a cooling operation mode and a heating operation mode.

(2) Description of the Related Art

In a heating and cooling system for an automotive vehicle, a refrigeration cycle is employed when cooling operation is performed, and when heating operation is performed, engine coolant is used as a heat source. Recently, however, due to the improvement in combustion efficiency of the engine, the temperature of the coolant does not rise high enough to obtain sufficient heating temperature in winter. For this reason, there is an increasing need for a system which can perform both cooling and heating. In a heating and cooling system of this kind, it is necessary to reverse the direction of flow of refrigerant flowing through an indoor heat exchanger and an outdoor heat exchanger, as the system is switched between cooling and heating operations. It is a four-way switching valve that switches the direction of flow of the refrigerant.

FIG. 17 is a block diagram showing the arrangement of a heating and cooling system using the four-way switching valve.

The heating and cooling system is comprised of a compressor 101, a four-way switching valve 102, an outdoor heat exchanger 103, a pressure-reducing device 104, an indoor heat exchanger 105, and an accumulator 106. The four-way switching valve 102 has four ports A to D. The port A of the four-way switching valve 102 is connected to a delivery side of the compressor 101, the port B is connected to the outdoor heat exchanger 103, the port C is connected to the indoor heat exchanger 105, and the port D is connected to the accumulator 106.

During cooling operation, the four-way switching valve 102 is switched such that the port A and the port B are communicated with each other and the port C and the port D are communicated with each other, as indicated by solid lines in FIG. 17. Therefore, a high-temperature and high-pressure refrigerant compressed by the compressor 101 flows into the port A of the four-way switching valve 102, and is sent from the port B to the outdoor heat exchanger 103, where the refrigerant is caused to undergo heat exchange and condensed, and then adiabatically expanded to a low-temperature and low-pressure refrigerant by the pressure-reducing device 104. The indoor heat exchanger 105 causes the low-temperature and low-pressure refrigerant to exchange heat with warm air in the compartment and evaporate. Then, the refrigerant flows through the port C and the port D of the four-way switching valve 102 to enter the accumulator 106, where the refrigerant is separated into gas and liquid, followed by returning to the compressor 101.

On the other hand, during heating operation, the four-way switching valve 102 is switched such that the port A and the port C are communicated with each other and the port B and the port D are communicated with each other, as indicated by broken lines in the figure. Therefore, the high-temperature and high-pressure refrigerant compressed by the compressor 101 flows through the port A and the port C of the four-way switching valve 102, to enter the indoor heat exchanger 105, where the refrigerant exchanges heat with cool air in the compartment to heat the same. The refrigerant condensed by the indoor heat exchanger 105 is adiabatically expanded to the low-temperature and low-pressure refrigerant by the pressure-reducing device 104. Then, the refrigerant undergoes heat exchange at the outdoor heat exchanger 103 to evaporate, and then passes through the port B and the port D of the four-way switching valve 102 to flow into the accumulator 106, where the refrigerant is separated into gas and liquid, followed by returning to the compressor 101.

As described above, the four-way switching valve 102 can switch the operation mode of the heating and cooling system, by switching the flow path of refrigerant.

As the four-way switching valve 102, there is one proposed in Japanese Patent Application No. 2001-183291 by the present applicant. This four-way switching valve is configured such that a first valve and a third valve for opening and closing passages from a port A into which a high-pressure refrigerant is introduced, to a port B or a port C, and a second valve and a fourth valve for opening and closing passages from the port B or the port C to a low-pressure port D are made separate and independent, and that the first valve and the second valve, and the third valve and the fourth valve are actuated by a first piston and a second piston, respectively. It is also configured such that two solenoid valves are provided for selectively guiding part of the high-pressure refrigerant introduced into the port A, to pressure chambers for the first and second pistons.

This enables the two solenoid valves to guide the high-pressure fluid from the port A into the pressure chamber for the first piston or that for the second piston in a switching manner, thereby making it possible to switch between a first state in which the port A is communicated with the port B, and the port C is communicated with the port D, and a second state in which the port A is communicated with the port C, and the port B is communicated with the port D.

However, due to the construction of the conventional four-way switching valve in which two sets of three-way switching valves are arranged in parallel with each other within a body, the body is increased in size, and further due to necessity of machining two sets of valve elements, and cylinders for receiving pistons for driving the valve elements, the manufacturing costs are increased.

SUMMARY OF THE INVENTION

The present invention has been made in view of these points, and an object thereof is to provide a four-way switching valve which is compact in size and inexpensive.

To achieve the object, there is provided a four-way switching valve for switching between a first state in which a fluid introduced into a first port is guided to a second port to allow the same to flow out therefrom and the fluid introduced into a third port is guided to a fourth port to allow the same to flow out therefrom, and a second state in which the fluid introduced into the first port is guided to the third port to allow the same to flow out therefrom and the fluid introduced into the second port is guided to the fourth port to allow the same to flow out therefrom. The four-way switching valve comprises a first three-way switching valve for carrying out a switching operation to cause the second port to communicate with the first port or the fourth port, a second three-way switching valve for carrying out a switching operation in unison with the first three-way switching valve to cause the third port to communicate with the fourth port or the first port, and a piston for simultaneously actuating a valve element of the first three-way switching valve and a valve element of the second three-way switching valve, the first three-way switching valve, the second three-way switching valve, and the piston being coaxially arranged within a hollow cylindrical body, wherein the first three-way switching valve and the second three-way switching valve each comprises the valve element axially slidably arranged on a driving rod axially arranged, for opening and closing valve holes formed at openings of passages which are arranged on axially both sides of the valve element and communicated with the first port and the fourth port, guides each fixed to the driving rod and axially protruding outward from axially opposite seating surfaces of the valve element via which the valve element is seated, for being inserted into the valve hole to close the valve hole before the valve element is seated, and at the same time for limiting an axially slidable range of the valve element, and a spring for urging the valve elements in such a direction that the valve element is brought into abutment with an axially outwardly arranged one of the guides.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 2 is a longitudinal sectional view showing the four-way switching valve according to the first embodiment of the invention, in a switching position taken when its solenoid is ON;

FIG. 5 is a longitudinal sectional view showing the four-way switching valve according to the third embodiment of the invention, in a switching position taken when its solenoid is ON;

FIG. 7 is a longitudinal sectional view showing the four-way switching valve according to the fourth embodiment of the invention, in a switching position taken when its solenoid is ON;

FIG. 12 is a longitudinal sectional view of the four-way switching valve according to the seventh embodiment of the invention, in a switching position taken when its solenoid is ON;

FIG. 15 is a longitudinal sectional view of the four-way switching valve according to the ninth embodiment of the invention, in a switching position taken when its solenoid is ON;

DESCRIPTION OF THE PREFERRED EMBODIMENTS

Hereinafter, an embodiment of the present invention will be described in detail with reference to drawings, based on a case of the present invention to be applied to a heat pump-type heating and cooling system for an automotive vehicle.

Figure 1:
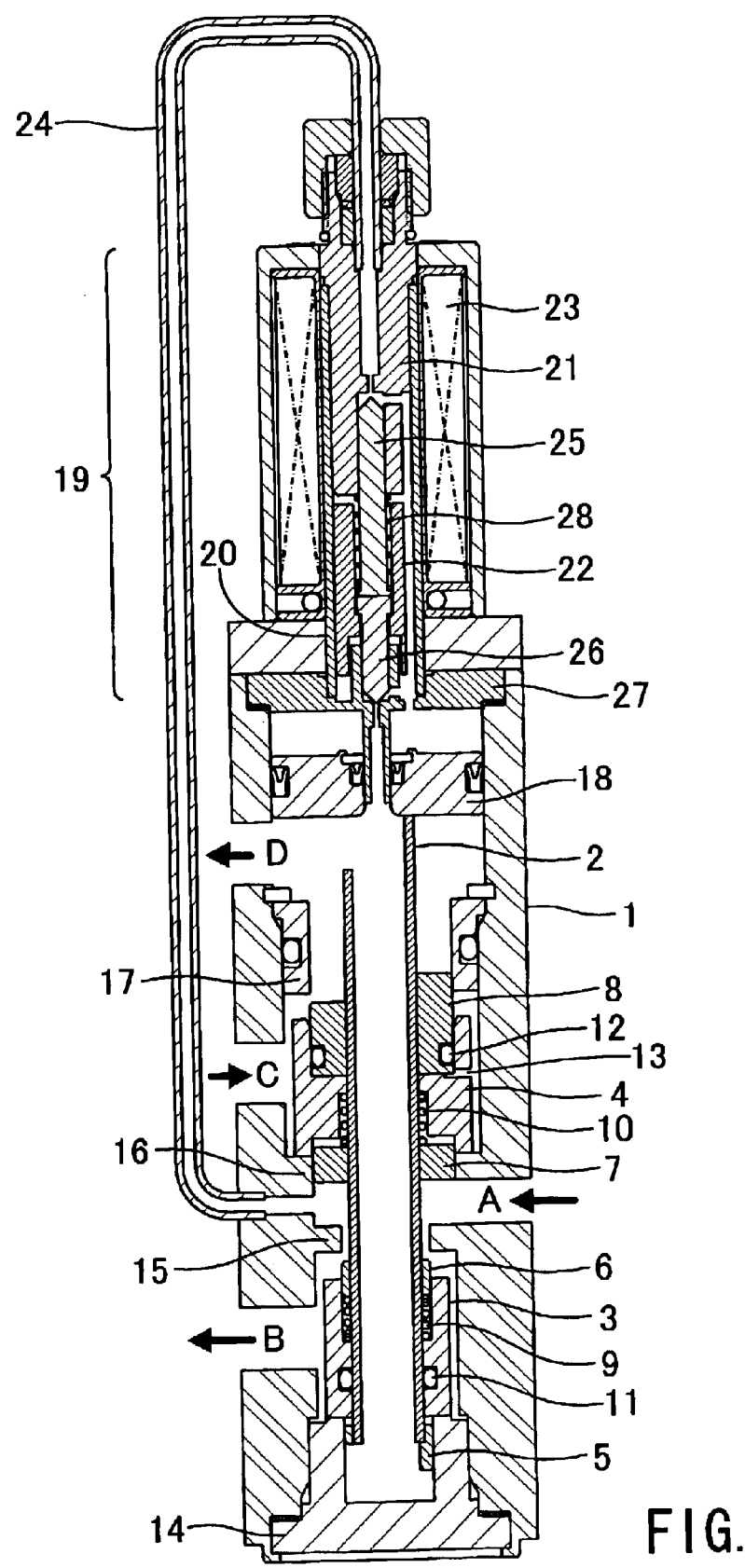
FIG. 1 is a longitudinal sectional view of a four-way switching valve according to a first embodiment of the invention, in a switching position taken when its solenoid is OFF.
Figure 2:
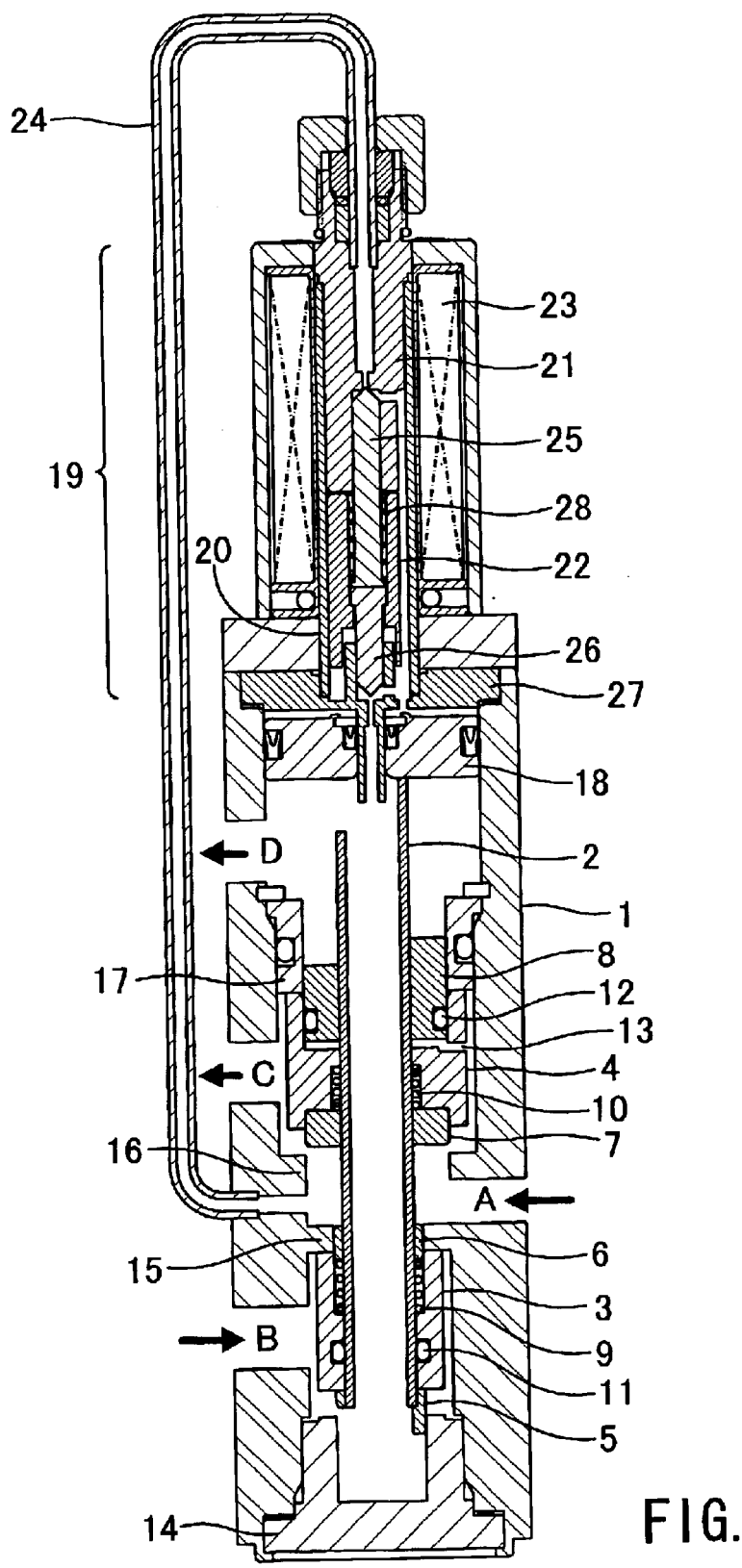

FIG. 1 is a longitudinal sectional view of the four-way switching valve according to a first embodiment of the invention, in a switching position taken when its solenoid is OFF. FIG. 2 is a longitudinal sectional view of the four-way switching valve according to the first embodiment of the invention, in a switching position taken when its solenoid is ON.

The four-way switching valve is formed with four ports A, B, C, and D opening in the periphery of a hollow cylindrical body 1. In the heat pump-type heating and cooling system, the port A is connected to piping for receiving a high-pressure refrigerant delivered from a compressor, the port B is connected to piping which leads to an external heat exchanger, the port C is connected to piping which leads to an internal heat exchanger, and the port D is connected to low-pressure refrigerant piping which leads to the suction side of the compressor.

The body 1 has a cylinder formed along a longitudinal central axis thereof in which a hollow sleeve 2 is axially movably arranged which defines a low-pressure side refrigerant passage through the center thereof. The sleeve 2 has two valve elements 3 and 4 axially slidably arranged thereon. Further, the sleeve 2 has guides 5, 6, 7, 8 secured thereto for limiting slidable ranges of the valve elements 3 and 4. Arranged between the valve elements 3, 4 and the guides 6, 7 are springs 9 and 10 for urging the valve elements 3 and 4 toward the guides 5 and 8, respectively.

Further, an O-ring 11 is arranged between the sleeve 2 and the valve element 3. The valve element 4 has recesses formed at upper and lower ends thereof, and arranged such that the valve element 4 partially overlaps the guides 7, 8, with an O-ring 12 arranged between the valve element 4 and the guide 8. The valve element 4 is also formed with an orifice 13 for introducing pressure to a surface thereof via which the valve element 4 is brought into abutment with the guide 8.

The body 1 has a lower end, as viewed in the figure, with an opening formed thereat being closed by a cap 14, and a recess is formed in a central portion of the inside of the cap 14, such that the recess forms a guide for axially guiding the guide 5 provided on the sleeve 2, and a refrigerant passage, with an annular end face thereof forming a valve seat for the valve element 3. Above the valve element 3, an annular projection 15 is integrally formed with the body 1 in a manner opposed to the valve element 3 to provide a valve seat for the valve element 3. Further, below the valve element 4, an annular projection 16 is integrally formed with the body 1 to provide a valve seat for the valve element 4. Further, above the valve element 4, a guide 17 is fitted in the body 1 to provide a low-pressure side valve seat for the valve element 4.

Now, the valve element 4, the guide 7, and the valve hole into which the guide 7 is loosely inserted are formed to have larger sizes than the valve element 3, the guide 6, and the valve hole into which the guide 6 is loosely inserted, respectively, whereby the pressure-receiving area of the valve element 4 is configured to be larger than the pressure-receiving area of the valve element 3. Due to this configuration, when the valve elements 3 and 4 receive high pressure introduced from the port A, an upwardly-pushing force, as viewed in the figure, acts on the valve elements 3, 4 and the sleeve 2 supporting them.

Further, the guides 5, 6, 7, 8 secured to the sleeve 2 are arranged in such positions that they are inserted into their respective associated valve holes prior to seating of the valve elements 3 and 4, thereby preventing the ports A, B, C, D from being simultaneously communicated with each other when the switching of the four-way switching valve is carried out. This prevents high-pressure refrigerant from directly flowing to the low-pressure side during the switching, so that pressures on the high-pressure side and the low-pressure side are maintained, thereby making it possible to smoothly switch between the cooling operation and the heating operation, without pressure loss.

In an upper location within the body 1, as viewed in the figure, a piston 18 is axially slidably arranged. Space on the upper side of the piston 18 forms a pressure chamber into which high pressure is introduced to push the piston 18 downward, thereby pushing down the valve elements 3, 4 and the sleeve 2 supporting them.

As described above, within the body 1, the valve element 3 forms a three-way switching valve for performing switching such that the port B is communicated with the port A or the port D in a switching manner, and the valve element 4 forms a three-way switching valve for performing switching such that the port C is communicated with the port A or the port D.

To cause the valve elements 3 and 4 to perform respective switching operations, a three-way solenoid valve 19 is arranged at a top of the body 1. The three-way solenoid valve 19 is comprised of a core 21 fixed to a sleeve 20 such that the core 21 closes the upper end of the sleeve 20, a plunger 22 axially movably arranged in the sleeve 20, and a coil 23 arranged outside the sleeve 20. A refrigerant passage axially extends through the core 21, and an annular projection serving as a valve seat is integrally formed with the core 21 at an intermediate location of the refrigerant passage. The refrigerant passage extending through the core 21 has an upper end formed with an opening which is connected via a tube 24 to a high-pressure space communicating with the port A. The refrigerant passage through the core 21 has a needle 25 axially movably arranged therein in a manner opposed to the annular projection from below, as viewed in the figure. Further, the plunger 22 has a needle 26 axially movably arranged therein. The needle 26 has a lower end thereof opposed to a valve seat formed in a cap 27 closing the opening at the top of the body 1. This valve seat is formed at an intermediate location of a passage communicating between the pressure chamber on the upper side of the piston 18 and space on the lower side thereof communicating with the port D. The cap 27 has a lower end of the sleeve 20 fitted therein, thereby forming a passage communicating between the inside of the sleeve 20 and the pressure chamber of the piston 18.

The core 21 and the plunger 22 have grooves longitudinally formed in the outer peripheries thereof, and the groove formed in the core 21 is further communicated with the space on the lower side of the annular projection within the core 21. Further, a spring 28 is interposed between the needle 25 and the core 21, for urging the plunger 22 and the needles 25, 26 in a downward direction, whereby when the coil. 23 is not energized, the needle 25 leaves the valve seat thereof while the needle 26 is seated on the valve seat thereof.

In the four-way switching valve constructed as above, as shown in FIG. 1, when the three-way solenoid valve 19 is not energized, i.e. when its solenoid is OFF, the plunger 22 of the three-way solenoid valve 19 is urged downward, as viewed in the figure, by the spring 28, whereby the needle 25 leaves its valve seat to cause the high-pressure chamber communicating with the port A to be communicated with the pressure chamber defined on the upper side of the piston 18 via the tube 24 and the three-way solenoid valve 19, while the needle 26 is seated on its valve seat to cut off communication between the pressure chamber defined on the upper side of the piston 18 and the low-pressure chamber communicating with the port D.

This causes the high-pressure refrigerant supplied to the port A to be introduced into the pressure chamber defined on the upper side of the piston 18 via the tube 24 and the three-way solenoid valve 19 to push the piston 18 down. The piston 18, in turn, pushes the sleeve 2 down to cause the valve element 3 to be seated on the end face of the cap 14 and the valve element 4 to be seated on the annular projection 16. At this time, the high pressure introduced from the port A acts on the valve element 3 in a valve-seating direction, which more positively ensured the sealing between the passage under the highest pressure and the passage under the lowest pressure.

As a result, the port A is communicated with the port B, and the port C is communicated with the port D. In other words, the heating and cooling system for an automotive vehicle is placed in a cooling operation mode in which the high-pressure refrigerant delivered from the compressor and received via the port A is allowed to flow from the port B to the external heat exchanger, and the refrigerant delivered from the internal heat exchanger and received via the port C is allowed to flow from the port D to the compressor.

Next, as shown in FIG. 2, immediately after the solenoid is ON, the plunger 22 of the three-way solenoid valve 19 is attracted to the core 21, which causes the needles 25, 26 to be moved upward as viewed in the figure so that the needle 25 is seated on its valve seat to block introduction of the high pressure from the port A, while the needle 26 leaves its valve seat to establish communication between the pressure chamber defined on the upper side of the piston 18 and the low-pressure chamber communicating with the port D. This deprives the piston 18 of the force pushing down the sleeve 2. At this time, the guide 7 receives the high pressure at the bottom surface thereof, while the guide 8 receives the low pressure at the top surface thereof, so that the sleeve 2 is pushed up to move upward. When the sleeve 2 starts to move upward, first, the guide 6 is inserted into the annular projection 15 to block the valve hole between the port A and the port B. Similarly, the guide 8 is guided into the central hole of the guide 17 to block the valve hole between the port C and the port D. When these guides 6, 8 start to be inserted, the other guide 5 still remains fitted in the cap 14 to close the communication between the port B and the port D, and the guide 7 is also fitted in the annular projection 16 to close communication between the port A and the port C. In short, all the ports A, B, C, D are closed.

When the sleeve 2 further moves upward, the guide 5 is moved upward together with the valve element 3 so that the valve element 3 leaves the cap 14, and is further moved upward to cause communication between the port B and the port D to be established when the guide 5 is removed from the cap 14. On the other hand, the guide 7 also causes the valve element 4 to move upward and leave the annular projection 16, and at the time point the guide 7 is moved out of the annular projection 16, the guide 8 now receives the high pressure via the orifice 13 to move upward. This upward motion is stopped when the valve element 4 is seated on the guide 17, to place the four-way switching valve in the state shown in FIG. 2. This establishes the communication between the port A and the port C, and at the same time, the valve element 4 is pushed upward by the guide 7 due to the high pressure acting on the guide 8 in an upward direction, thereby more positively ensuring the sealing. It should be noted that in this state, even after the valve element 4 is seated, the sleeve 2 still attempts to move upward due to the high pressure acting on the guide 8 by leaving the valve element 4 at the guide 17. This upward motion is stopped by the valve element 3 being seated on the annular projection 15, with the difference in the traveling distances is accommodated by the spring 10. Thus, the valve elements 3, 4 are individually seated without being seated simultaneously, and are cushioned by the springs 9, 10, respectively. This eliminates the possibilities of one of them developing defective sealing due to the problems of machining accuracy, assembly tolerance of component parts, etc.

As a result, the heating and cooling system for an automotive vehicle is switched to a heating operation mode in which the high-pressure refrigerant delivered from the compressor and received via the port A is allowed to flow from the port C to the internal heat exchanger, and the refrigerant delivered from the external heat exchanger and received via the port B is allowed to flow from the port D to the compressor.

As described above, in switching the operation mode, the three-way solenoid valve 19 causes the high-pressure refrigerant to be introduced into the pressure chamber defined on the upper side of the piston 18, thereby causing the valve elements 3, 4 to be pushed down, or causes the pressure chamber defined on the upper side of the piston 18 to communicate with the port D to reduce the pressure in the chamber, with the pressure-receiving areas of the guides 7, 8 configured to be larger than that of the guide 6, whereby the guide 8 is caused to push the valve elements 3, 4 upward.

Figure 3:
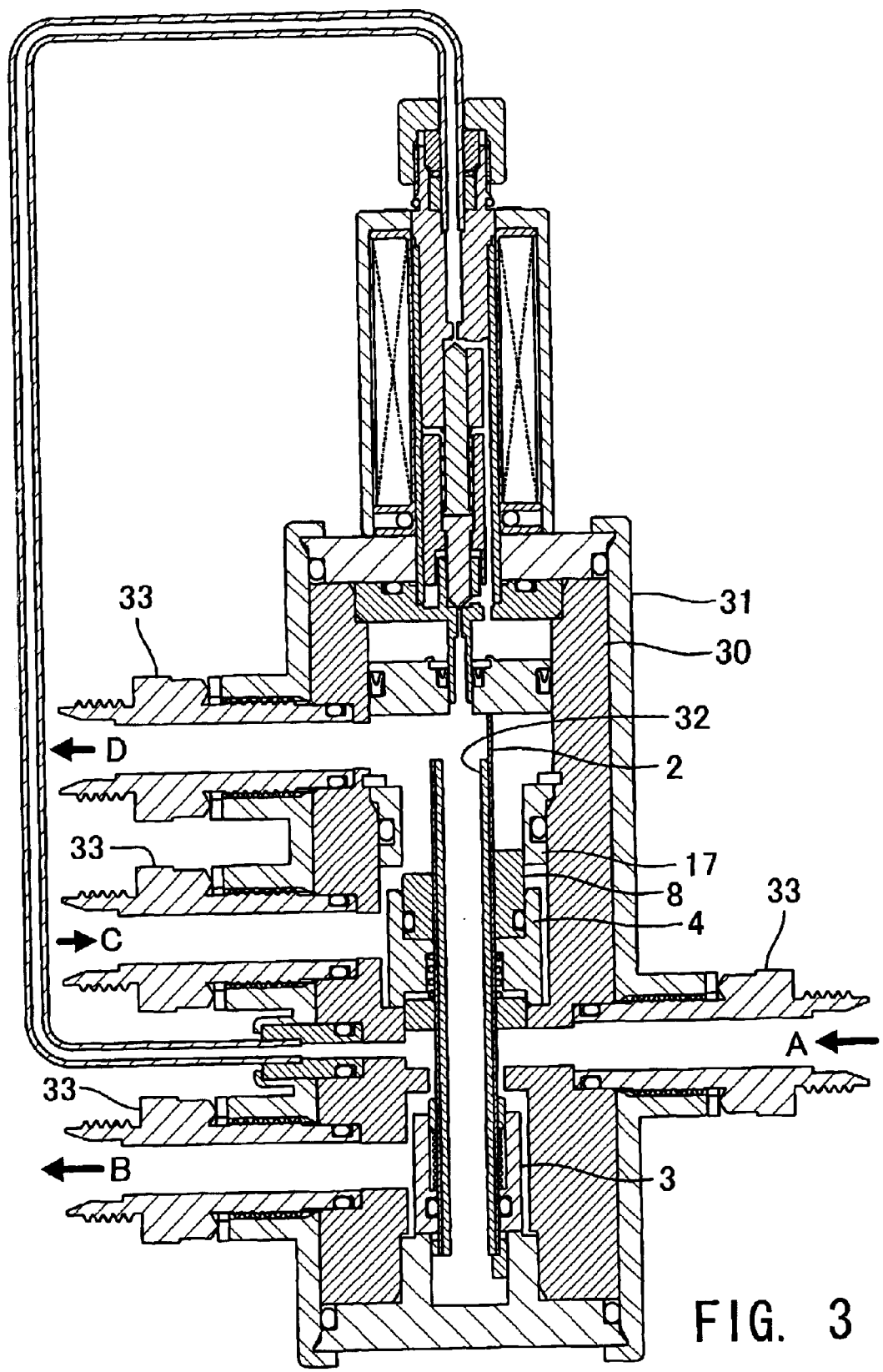
FIG. 3 is a longitudinal sectional view of a four-way switching valve according to a second embodiment of the invention, in a switching position taken when its solenoid is OFF.

FIG. 3 is a longitudinal sectional view of a four-way switching valve according to a second embodiment of the invention, in a switching position taken when its solenoid is OFF. It should be noted that in FIG. 3, component parts and elements similar or equivalent to those of the four-way switching valve shown in FIG. 1 are designated by identical reference numerals, and detailed description thereof is omitted.

When compared with the four-way switching valve according to the first embodiment, the four-way switching valve according to the second embodiment has substantially the same internal structure, and operates in the same way, but has a different external body structure. More specifically, the four-way switching valve according to the second embodiment has a resin body 30 forming the body thereof, and a metal body 31 covering the outside of the resin body 30. The resin body 30 is made of a heat-resistant resin. When carbon dioxide, for example, is used as the refrigerant of a heating and cooling system for an automotive vehicle, the maximum temperature of the refrigerant delivered from the compressor becomes approximately 170° C., and hence as the resin, polyphenylene sulfide which is resistant to a temperature higher than this temperature is used. Thus, the inner part of the body is formed by the resin body 30 to suppress heat conduction, and hence heat loss within the four-way switching valve. Further, since the outer part of the body is formed by the metal body 31, the pressure-resistant properties of the body are maintained.

Further, preferably, the valve elements 3, 4 and the guide 17 existing in the refrigerant passages are formed by a resin, and further, the sleeve 2 has its inner peripheral surface covered with a resin lining 32. This embodiment is further configured such that joints 33 for connecting pipes of refrigerant piping are screwed to the metal body 31.

It should be noted that although, in this embodiment, the valve element 4 is not particularly formed with an orifice for introducing pressure to a surface thereof via which the valve element 4 is brought into abutment with the surface of the guide 8, clearance formed between the sleeve 2 and the valve element 4 axially slidably arranged thereon performs the function of the orifice 13. Therefore, when high-pressure refrigerant is introduced into space communicating between the port A and the port C, the guide 8 receives the high pressure via the clearance between the sleeve 2 and the valve element 4, and acts to push up the sleeve 2, and the valve elements 3, 4.

Figure 4:
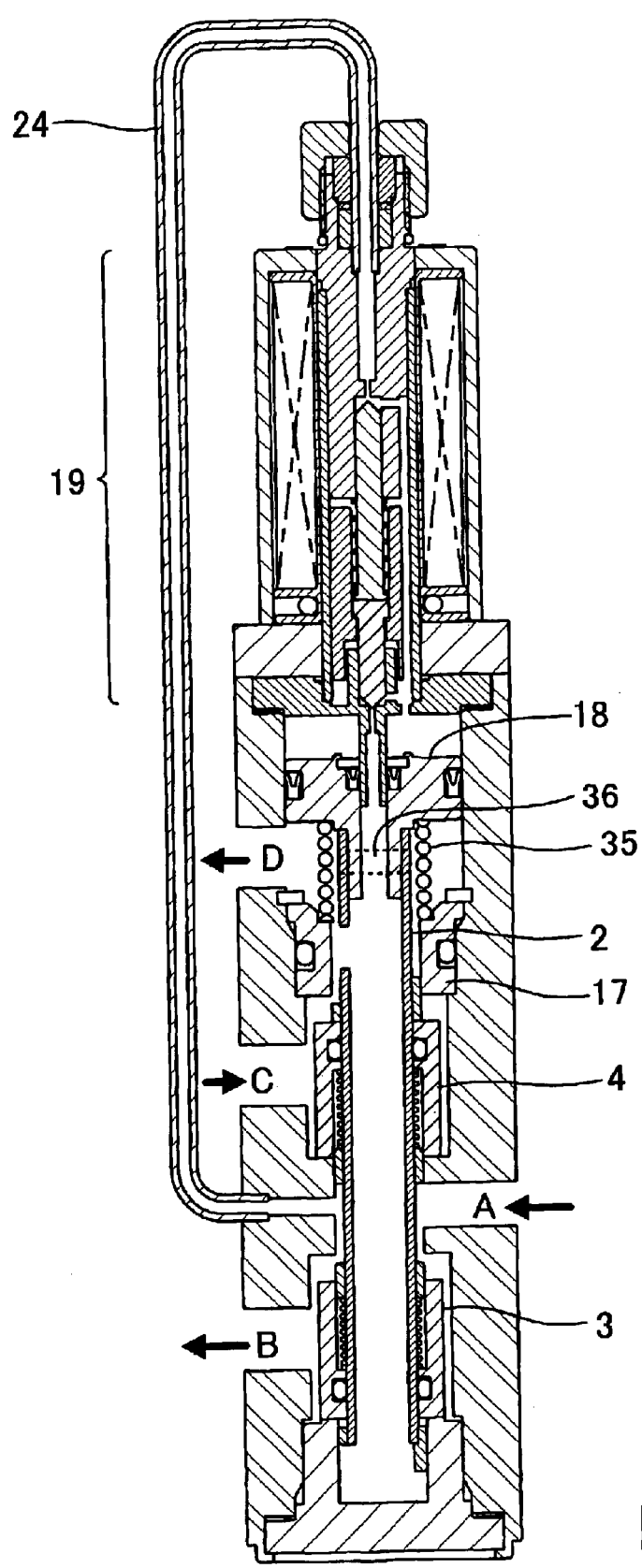
FIG. 4 is a longitudinal sectional view of a four-way switching valve according to a third embodiment of the invention, in a switching position taken when its solenoid is OFF.
Figure 5:
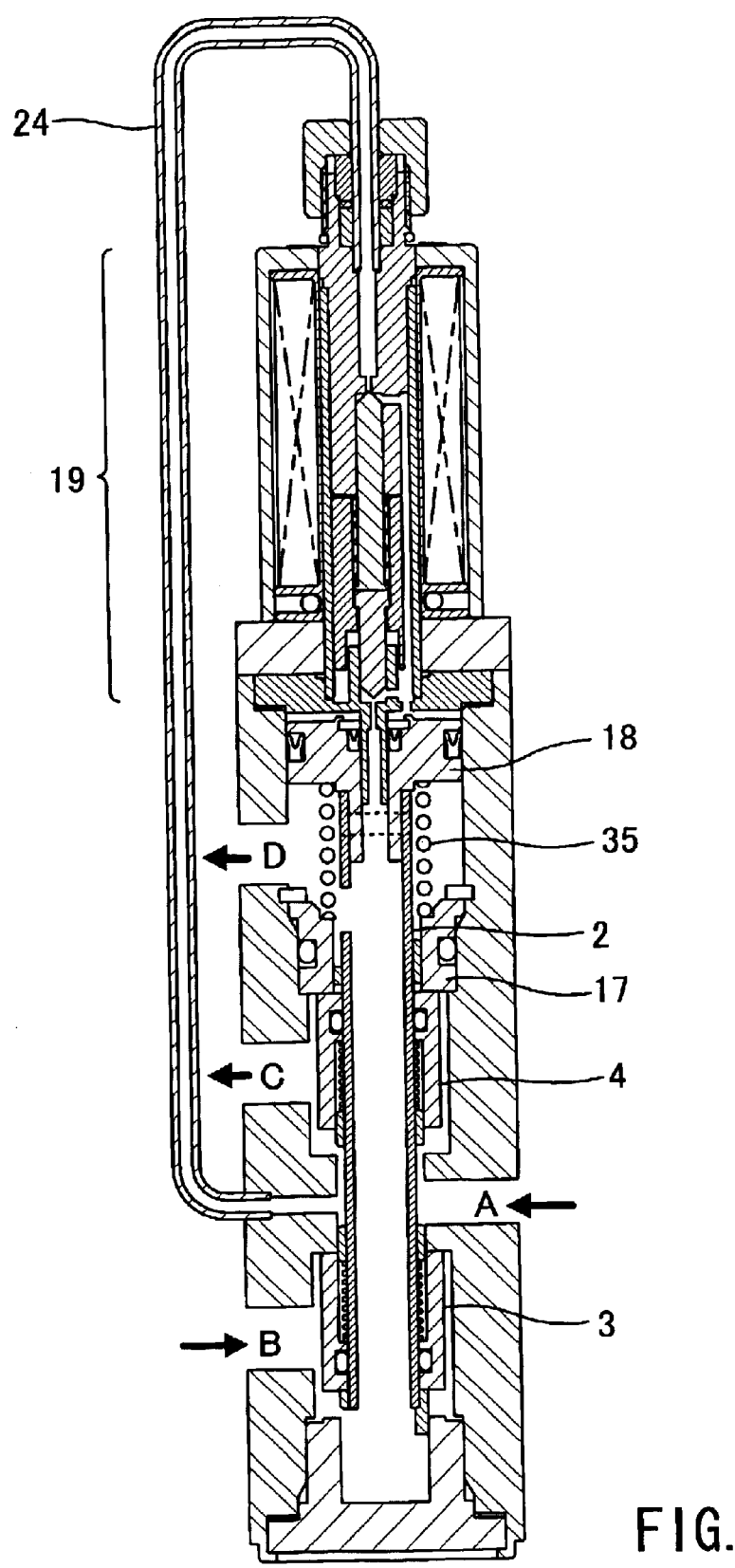

FIG. 4 is a longitudinal sectional view of a four-way switching valve according to a third embodiment of the invention, in a switching position taken when its solenoid is OFF. FIG. 5 is a longitudinal sectional view of the four-way switching valve according to the third embodiment of the invention, in a switching position taken when its solenoid is ON. It should be noted that in FIGS. 4 and 5, component parts and elements similar or equivalent to those of the four-way switching valve shown in FIG. 1 are designated by identical reference numerals, and detailed description thereof is omitted.

When compared with the four-way switching valve according to the first embodiment, the four-way switching valve according to the third embodiment has valve elements 3, 4 having the same dimensions, and the force of pushing up the valve elements 3, 4 is obtained by a spring 35.

That is, the sleeve 2 and the piston 18 are connected by a shaft 36, and a spring 35 is arranged between the guide 17 and the piston 18, for urging the piston 18 upward as viewed in the figure, whereby the sleeve 2 connected to the piston 18 and the valve elements 3, 4 supported on the sleeve 2 are urged upward as viewed in the figure.

In the four-way switching valve constructed as above, as shown in FIG. 4, when the solenoid is OFF, the high pressure present at the port A is introduced into the pressure chamber defined on the upper side of the piston 18 via the tube 24 and the three-way solenoid valve 19 to overcome the urging force of the spring 35, thereby pushing the piston 18 downward as viewed in the figure.

As a result, the port A is communicated with the port B, and the port C is communicated with the port D. This places the heating and cooling system for an automotive vehicle in the cooling operation mode in which the high-pressure refrigerant delivered from the compressor and received via the port A is allowed to flow from the port B to the external heat exchanger, and the refrigerant delivered from the internal heat exchanger and received via the port C is allowed to flow from the port D to the compressor.

Next, when the solenoid is ON, as shown in FIG. 5, the pressure in the pressure chamber defined on the upper side of the piston 18 is reduced to deprive the piston 18 of the driving force, so that the spring 35 pushes the piston 18 upward as viewed in the figure, whereby the sleeve 2 connected to the piston 18 and the valve elements 3, 4 supported on the sleeve 2 are pushed upward as viewed in the figure.

As a result, the port A is communicated with the port C, and the port B is communicated with the port D. This switches the heating and cooling system for an automotive vehicle to the heating operation mode in which the high-pressure refrigerant delivered from the compressor and received via the port A is allowed to flow from the port C to the internal heat exchanger, and the refrigerant delivered from the external heat exchanger and received via the port B is allowed to flow from the port D to the compressor.

Figure 6:
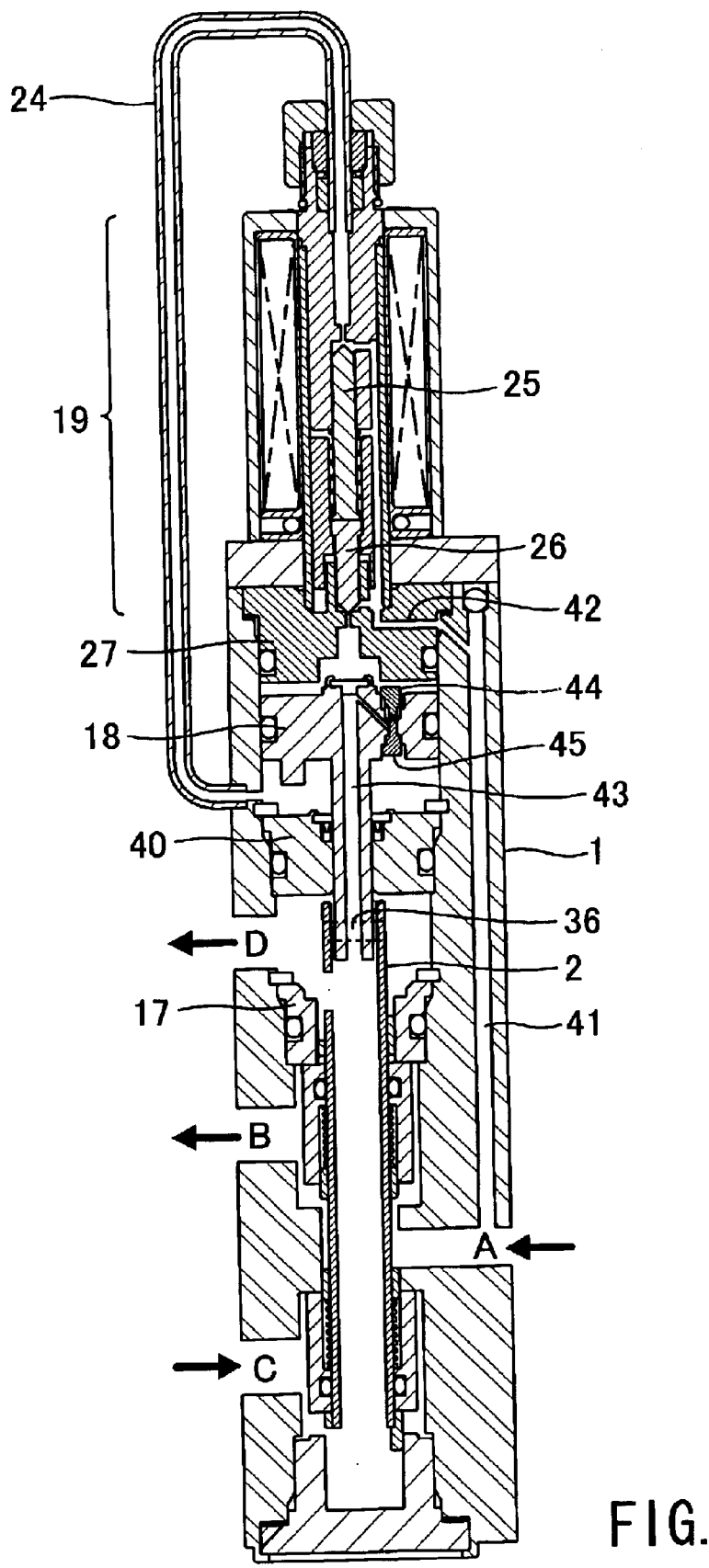
FIG. 6 is a longitudinal sectional view of a four-way switching valve according to a fourth embodiment of the invention, in a switching position taken when its solenoid is OFF.
Figure 7:
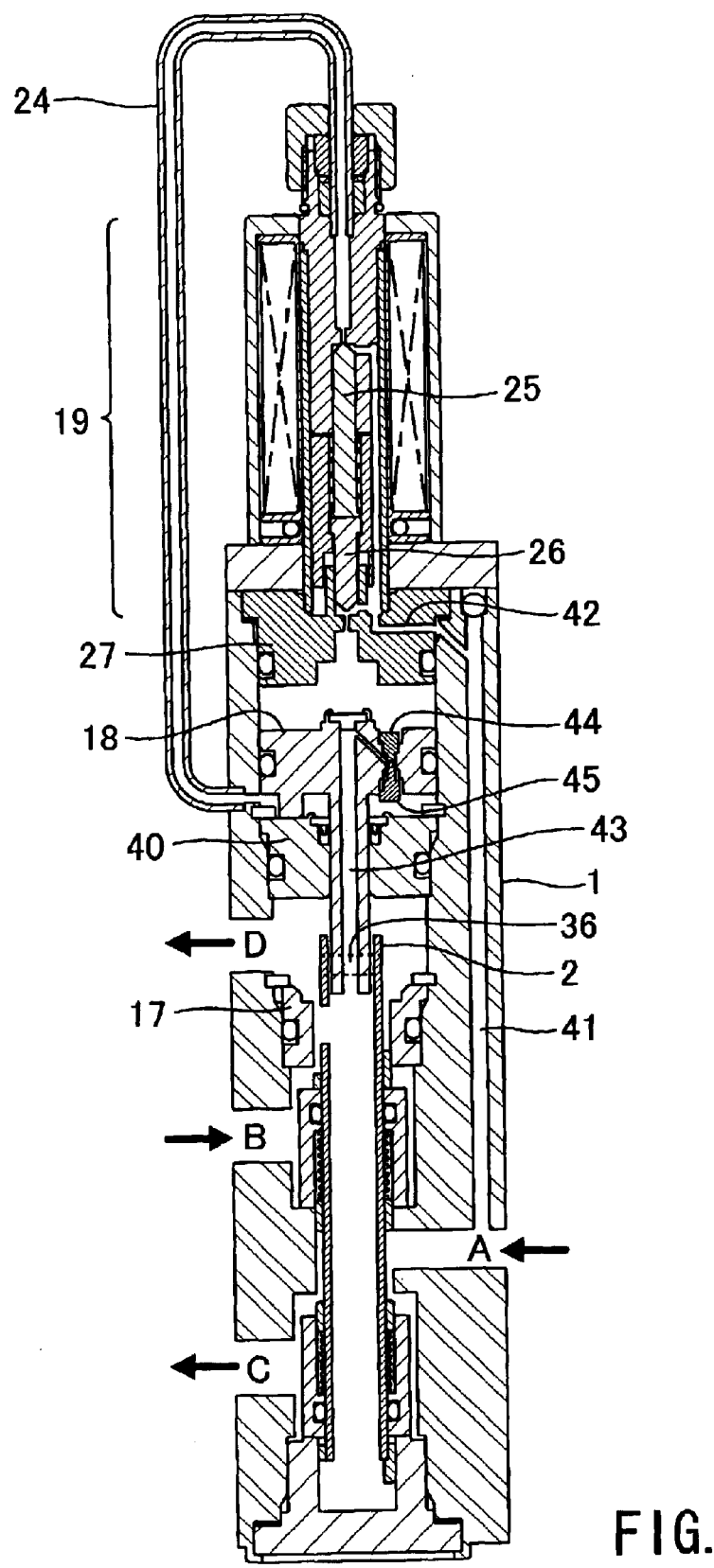

FIG. 6 is a longitudinal sectional view of a four-way switching valve according to a fourth embodiment of the invention, in a switching position taken when its solenoid is OFF. FIG. 7 is a longitudinal sectional view of the four-way switching valve according to the fourth embodiment of the invention, in a switching position taken when its solenoid is ON. It should be noted that in FIGS. 6 and 7, component parts and elements similar or equivalent to those of the four-way switching valve shown in FIG. 1 are designated by identical reference numerals, and detailed description thereof is omitted.

The four-way switching valve according to the fourth embodiment of the invention is distinguished from that according to the first embodiment in that pressure chambers are formed on upper and lower sides of the piston 18, and the three-way solenoid valve 19 selectively introduces the high-pressure refrigerant into these pressure chambers, whereby the piston 18 is moved to actuate the valve elements 3, 4.

More specifically, a guide 40 is arranged between the guide 17 forming the valve seat for the valve element 4 and the piston 18 to define a pressure chamber on the lower side of the piston 18. Further, the body land its cap 27 are formed with refrigerant passages 41, 42, for introducing the high-pressure refrigerant to the three-way solenoid valve 19, and one outlet port of the three-way solenoid valve 19 is communicated with the pressure chamber defined on the upper side of the piston 18 via a valve hole which is opened and closed by the needle 26, and the other outlet port of the same is communicated with a pressure chamber defined on the lower side of the piston 18 via a valve hole which is opened and closed by the needle 25 and the tube 24. Further, the piston 18 has a refrigerant passage 43 which extends axially and is closed at an upper end thereof, and further a small-diameter communication passage is formed to communicate between the refrigerant passage 43 and the pressure chambers defined on the upper and lower sides of the piston 18, with valve elements 44, 45 arranged in communication passages to the small-diameter communication passage, for receiving the pressures in the pressure chambers to close the communication passages, respectively. These valve elements 44, 45 are arranged in a manner opposed to each other, such that when one of these valve elements 44, 45 operates to close its communication passage, the other operates to open its communication passage in an interlocked fashion, whereas when the other operates to close its communication passage, the one operates to open its communication passage in an interlocked fashion. Further, the piston 18 has a lower end which protrudes downward, as viewed in the figure, to extend through the guide 40, and is connected to the sleeve 2 by the shaft 36.

It should be noted that the four-way switching valve according to the fourth embodiment has the arrangement of ports thereof distinguished from that of the first to third embodiments in that the port B and the port C are arranged in a reversed fashion.

In the four-way switching valve constructed above, as shown in FIG. 6, when the solenoid is OFF, the high pressure present at the port A is introduced into the pressure chamber defined on the lower side of the piston 18 via the refrigerant passages 41, 42, the three-way solenoid valve 19, and the tube 24, to push the piston 18 upward as viewed in the figure. At this time, the pressure in the pressure chamber defined on the lower side of the piston 18 urges the valve element 45 to cut off the communication between the pressure chamber on the lower side of the piston 18 and the refrigerant passage 43 under low pressure, whereby the valve element 45 urges the valve element 44 to establish communication between the pressure chamber on the upper side of the piston 18 and the refrigerant passage 43 under low pressure.

This causes the piston 18 to move the sleeve 2 upward, to switch the two three-way switching valves, whereby the port A is communicated with the port B, and the port C is communicated with the port D. Therefore, the heating and cooling system for an automotive vehicle is placed in the cooling operation mode in which the high-pressure refrigerant delivered from the compressor and received via the port A is allowed to flow from the port B to the external heat exchanger, and the refrigerant delivered from the internal heat exchanger and received via the port C is allowed to flow from the port D to the compressor.

Next, when the solenoid is ON, as shown in FIG. 7, the high pressure present at the port A is introduced into the pressure chamber defined on the upper side of the piston 18 via the refrigerant passages 41, 42 and the three-way solenoid valve 19, to push the piston 18 downward as viewed in the figure. At this time, the pressure in the pressure chamber defined on the upper side of the piston 18 urges the valve element 44 to cut off the communication between the pressure chamber on the upper side of the piston 18 and the refrigerant passage 43 under low pressure, whereby the valve element 44 urges the valve element 45 to cause the pressure chamber on the lower side of the piston 18 and the refrigerant passage 43 under low pressure to be communicated with each other.

This causes the piston 18 to push down the sleeve 2 to switch the two three-way switching valves, whereby the port A is communicated with the port C and the port B is communicated with the port D. Therefore, the heating and cooling system for an automotive vehicle is placed in the heating operation mode in which the high-pressure refrigerant delivered from the compressor and received via the port A is allowed to flow from the port C to the internal heat exchanger, and the refrigerant delivered from the external heat exchanger and received via the port B is allowed to flow from the port D to the compressor.

Figure 8:
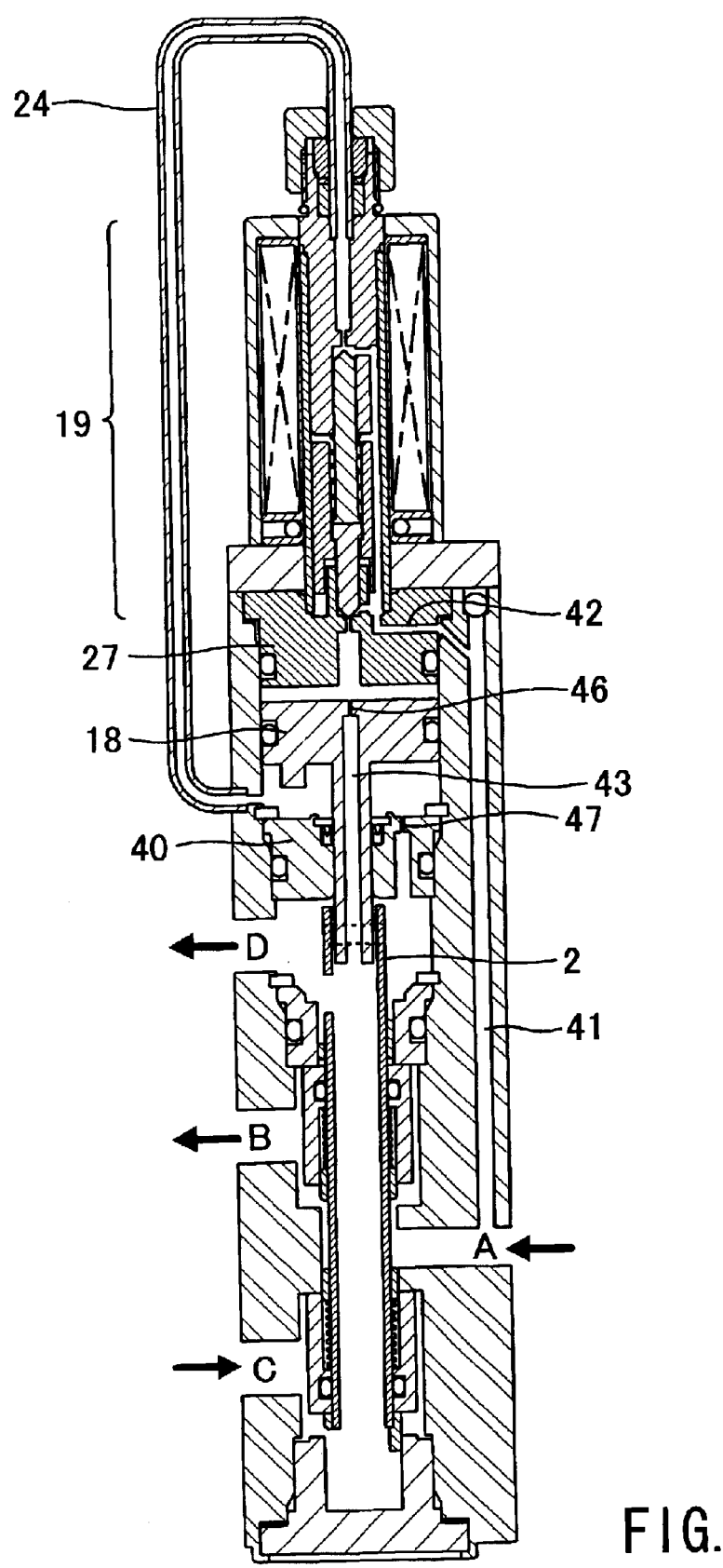
FIG. 8 is a longitudinal sectional view of a four-way switching valve according to a fifth embodiment of the invention, in a switching position taken when its solenoid is OFF.

FIG. 8 is a longitudinal sectional view of a four-way switching valve according to a fifth embodiment of the invention, in a switching position taken when its solenoid is OFF. It should be noted that in FIG. 8, component parts and elements similar or equivalent to those of the four-way switching valve shown in FIG. 6 are designated by identical reference numerals, and detailed description thereof is omitted.

The four-way switching valve according to the fifth embodiment is distinguished from that according to the fourth embodiment in that the functions of the valve elements 44, 45 provided in the piston 18 are formed by orifices.

More specifically, the piston 18 has an orifice 46 communicating between the refrigerant passage 43 axially extending through the piston 18 and the pressure chamber on the upper side of the same, and the guide 40 has an orifice 47 communicating between the pressure chamber on the lower side of the piston 18 and the low-pressure space at the port D.

In the four-way switching valve constructed as above, as shown in FIG. 8, when its solenoid is OFF, the high pressure at the port A is introduced into the pressure chamber on the lower side of the piston 18 via the refrigerant passages 41, 42, the three-way solenoid valve 19, and the tube 24. At this time, although the refrigerant leaks from the pressure chamber on the lower side of the piston 18 to the low-pressure space at the port D via the orifice 47 at a slight flow rate, the high pressure in the compression chamber on the lower side is maintained because the high-pressure refrigerant is introduced therein at a much higher flow rate, whereas the refrigerant leaks from the pressure chamber on the upper side of the piston 18, to which introduction of high pressure is stopped, to the low-pressure space at the port D via the orifice 46 at a slight flow rate to progressively decrease the pressure in the pressure chamber on the upper side. This causes the piston 18 to be pushed upward as viewed in the figure.

This causes the piston 18 to move the sleeve 2 upward, to switch the two three-way switching valves, whereby the port A is communicated with the port B, and the port C is communicated with the port D. Therefore, the heating and cooling system for an automotive vehicle is placed in the cooling operation mode in which the high-pressure refrigerant delivered from the compressor and received via the port A is allowed to flow from the port B to the external heat exchanger, and the refrigerant delivered from the internal heat exchanger and received via the port C is allowed to flow from the port D to the compressor.

On the other hand, when the solenoid is ON, the high pressure present at the port A is introduced into the pressure chamber on the upper side of the piston 18 via the refrigerant passages 41, 42, and the three-way solenoid valve 19. At this time, although the refrigerant leaks from the pressure chamber on the upper side of the piston 18 to the low-pressure space at the port D via the orifice 46 at a slight flow rate, the high pressure in the compression chamber on the upper side is maintained because the high-pressure refrigerant is introduced therein at a much higher flow rate, whereas the refrigerant leaks from the pressure chamber on the lower side of the piston 18, to which introduction of high pressure is stopped, to the low-pressure space at the port D via the orifice 47 at a slight flow rate to progressively decrease the pressure in the pressure chamber on the lower side. This causes the piston 18 to be pushed downward as viewed in the figure.

This causes the piston 18 to push the sleeve 2 downward, to thereby switch the two three-way solenoid valves such that the port A is communicated with the port C and the port B is communicated with port D. This switches the heating and cooling system for an automotive vehicle to the heating operation mode in which the high-pressure refrigerant delivered from the compressor and received via the port A is allowed to flow from the port C to the internal heat exchanger, and the refrigerant delivered from the external heat exchanger and received via the port B is allowed to flow from the port D to the compressor.

Figure 9:
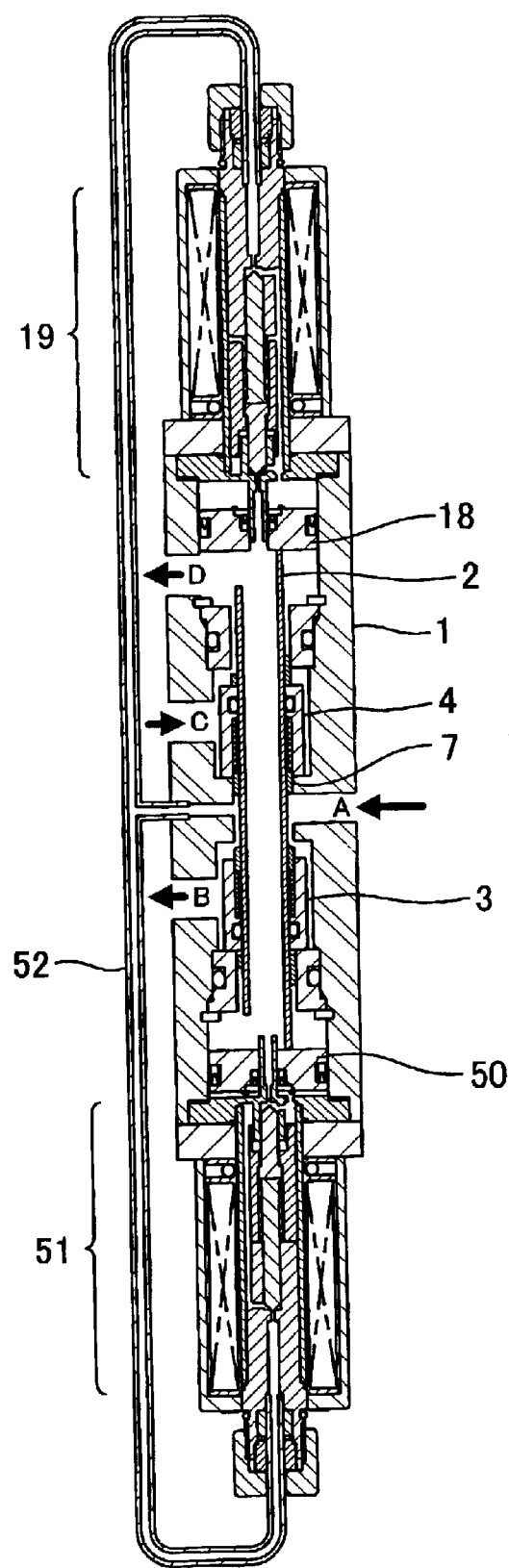
FIG. 9 is a longitudinal sectional view of a four-way switching valve according to a sixth embodiment of the invention, in a first switching position.
Figure 10:
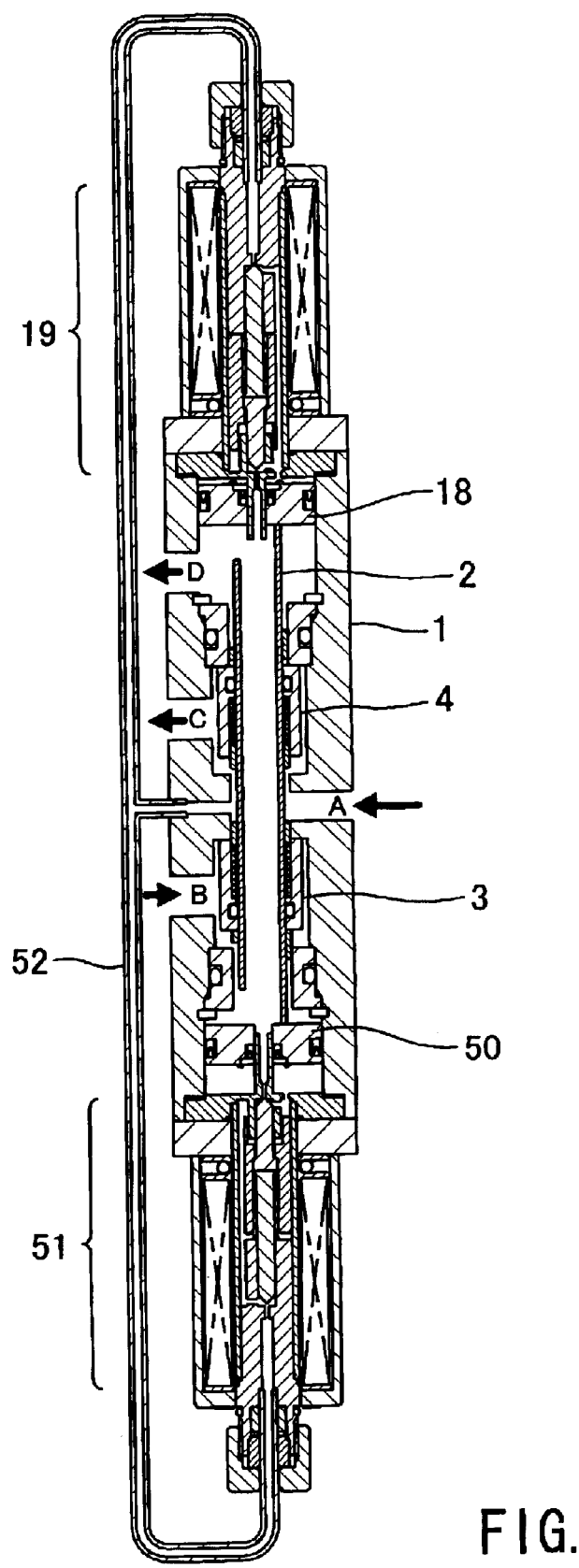
FIG. 10 is a longitudinal sectional view showing the four-way switching valve according to the sixth embodiment of the invention, in a second switching position.

FIG. 9 is a longitudinal sectional view of a four-way switching valve according to a sixth embodiment of the invention, in a first switching position. FIG. 10 is a longitudinal sectional view of the four-way switching valve according to the sixth embodiment of the invention, in a second switching position. It should be noted that in FIGS. 9 and 10, component parts and elements similar or equivalent to those of the four-way switching valve shown in FIG. 1 are designated by identical reference numerals, and detailed description thereof is omitted.

The four-way switching valve according to the sixth embodiment is distinguished from that according to the first embodiment in which the piston 18 and the three-way solenoid valve 19 are configured to push the valve elements 3, 4, downward, in that the body 1 is configured to have the same construction at an opposite end thereof to push the valve elements 3, 4 upward.

More specifically, a piston 50 and a three-way solenoid valve 51 are provided on the lower end of the body 1, and the three-way solenoid valve 51 and the high-pressure space communicating with the port A are connected by a tube 52. The tube 52 is also connected to the three-way solenoid valve 19.

In the four-way switching valve constructed as above, as shown in FIG. 9, when the upper three-way solenoid valve 19 is not energized, i.e. when its solenoid is OFF, and when the lower three-way solenoid valve 51 is energized, i.e. when its solenoid is ON, the upper three-way solenoid valve 19 communicates the pressure chamber on the upper side of the piston 18 with the port A to increase the pressure in the pressure chamber, while the lower three-way solenoid valve 51 communicates the pressure chamber on the lower side of the piston 50 with the port D to decrease the pressure in the pressure chamber, whereby the piston 18 pushes the sleeve 2 downward. This causes the valve elements 3, 4 to be moved downward so that the port A is communicated with the port B and the port C is communicated with the port D. Therefore, the heating and cooling system for an automotive vehicle is placed in the cooling operation mode in which the high-pressure refrigerant delivered from the compressor and received via the port A is allowed to flow from the port B to the external heat exchanger, and the refrigerant delivered from the internal heat exchanger and received via the port C is allowed to flow from the port D to the compressor.

Next, as shown in FIG. 10, when the upper three-way solenoid valve 19 and the lower three-way solenoid valve 51 are switched in their energized state to energize the upper three-way solenoid valve 19 and de-energize the lower three-way solenoid valve 51, the upper three-way solenoid valve 19 causes the pressure chamber on the upper side of the piston 18 to communicate with the port D to decrease the pressure in the pressure chamber, and the lower three-way solenoid valve 51 causes the pressure chamber on the lower side of the piton 50 to communicate with the port A to increase the pressure in the pressure chamber. This causes the piston 50 to push the sleeve 2 upward, so that the valve elements 3, 4 are pushed upward to cause the port A to communicate with the port C and the port B to communicate with the port D. This switches the heating and cooling system for an automotive vehicle to the heating operation mode in which the high-pressure refrigerant delivered from the compressor and received via the port A is allowed to flow from the port C to the internal heat exchanger, and the refrigerant delivered from the external heat exchanger and received via the port B is allowed to flow from the port D to the compressor.

Figure 11:
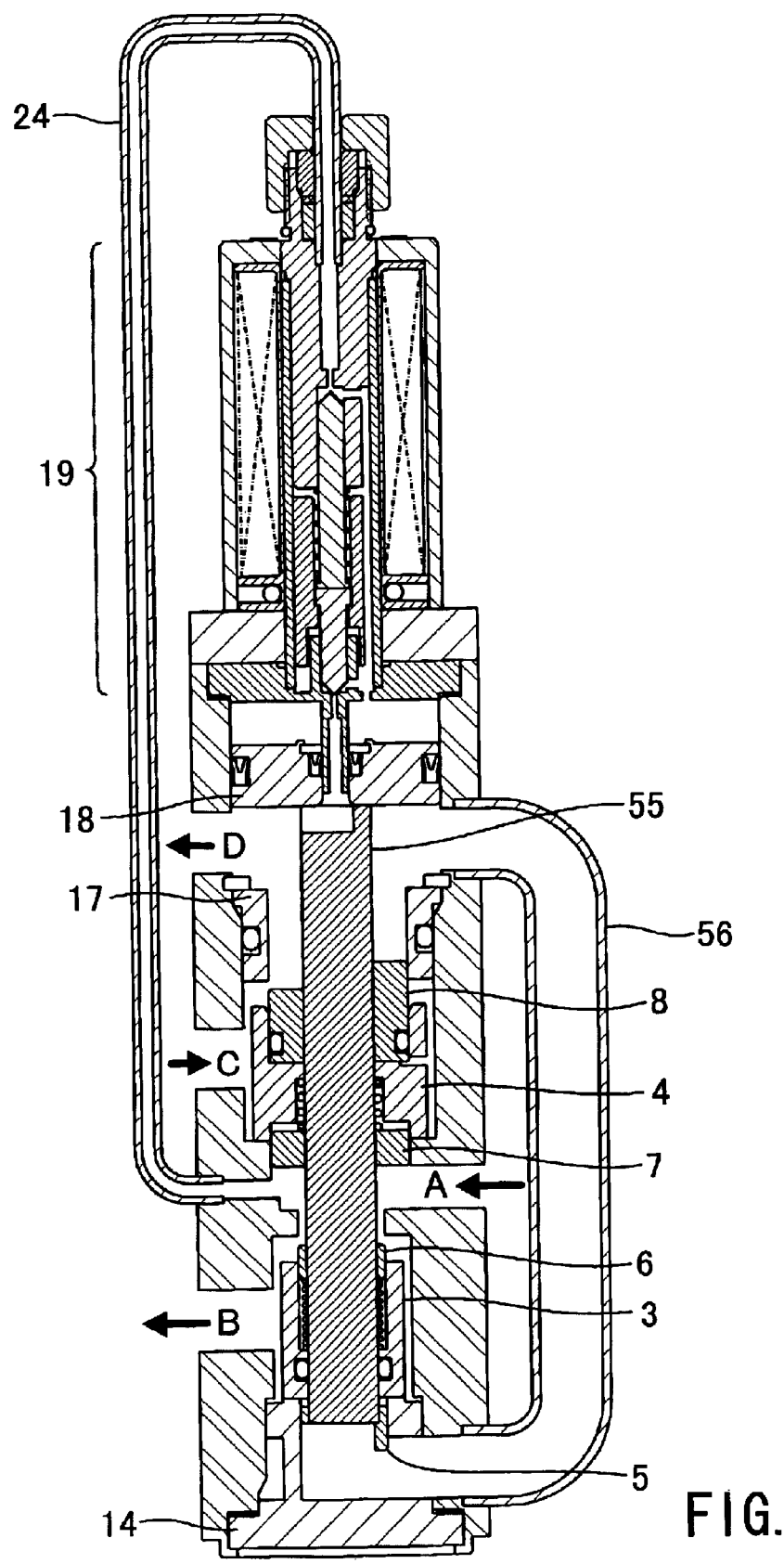
FIG. 11 is a longitudinal sectional view of a four-way switching valve according to a seventh embodiment of the invention, in a switching position taken when its solenoid is OFF.
Figure 12:
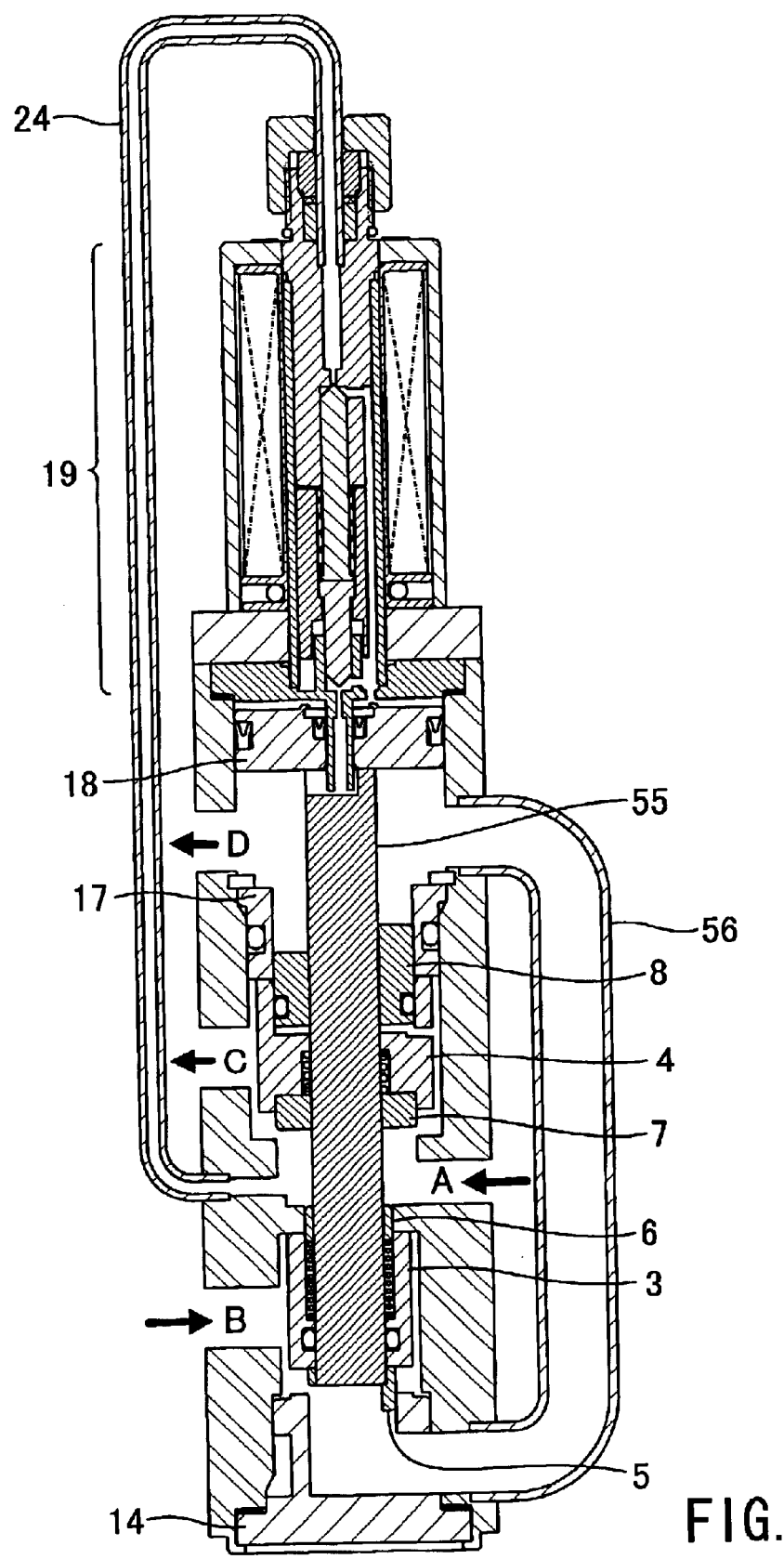

FIG. 11 is a longitudinal sectional view of a four-way switching valve according to a seventh embodiment of the invention, in a switching position taken when its solenoid is OFF. FIG. 12 is a longitudinal sectional view of the four-way switching valve according to the seventh embodiment of the invention, in a switching position taken when its solenoid is ON. It should be noted that in FIGS. 11 and 12, component parts and elements similar or equivalent to those of the four-way switching valve shown in FIG. 1 are designated by identical reference numerals, and detailed description thereof is omitted.

When compared with the four-way switching valve according to the first embodiment, the four-way switching vale according to the seventh embodiment has substantially the same internal construction, and operates in the same manner, but is different in the construction of the low-pressure refrigerant passages. More specifically, in this four-way switching valve according to the seventh embodiment, the valve elements 3, 4 and the guides 5, 6, 7, 8 are held on a driving rod 55, and spaces at both ends of the driving rod 55, i.e. a space in a recess formed in the cap 14 to define a refrigerant passage together with a guide for axially guiding the guide 5, and a space defined between the guide 17 and the piston 18 are connected by a tube 56.

In the four-way switching valve constructed as above, as shown in FIG. 11, when its solenoid is OFF, the high pressure present at the port A is introduced into the pressure chamber defined on the upper side of the piston 18 via the tube 24 and the three-way solenoid valve 19, thereby pushing the piston 18 downward as viewed in the figure.

As a result, the port A is communicated with the port B, and the port C is communicated with the port D. This places the heating and cooling system for an automotive vehicle in the cooling operation mode in which the high-pressure refrigerant delivered from the compressor and received via the port A is allowed to flow from the port B to the external heat exchanger, and the refrigerant delivered from the internal heat exchanger and received via the port C is allowed to flow from the port D to the compressor.

Then, when the solenoid is ON, as shown in FIG. 12, the pressure chamber on the upper side of the piston 18 is switched to the low pressure, and the guides 7, 8 fixed to the driving rod 55 receive larger pressure than the guide 6.

This causes the driving rod 55 to be pushed upward as viewed in the figure, whereby the port A is communicated with the port C, and the port B is communicated with the port D via the tube 56. This switches the heating and cooling system for an automotive vehicle to the heating operation mode in which the high-pressure refrigerant delivered from the compressor and received via the port A is allowed to flow from the port C to the internal heat exchanger, and the refrigerant delivered from the external heat exchanger and received via the port B is allowed to flow from the port D to the compressor.

Figure 13:
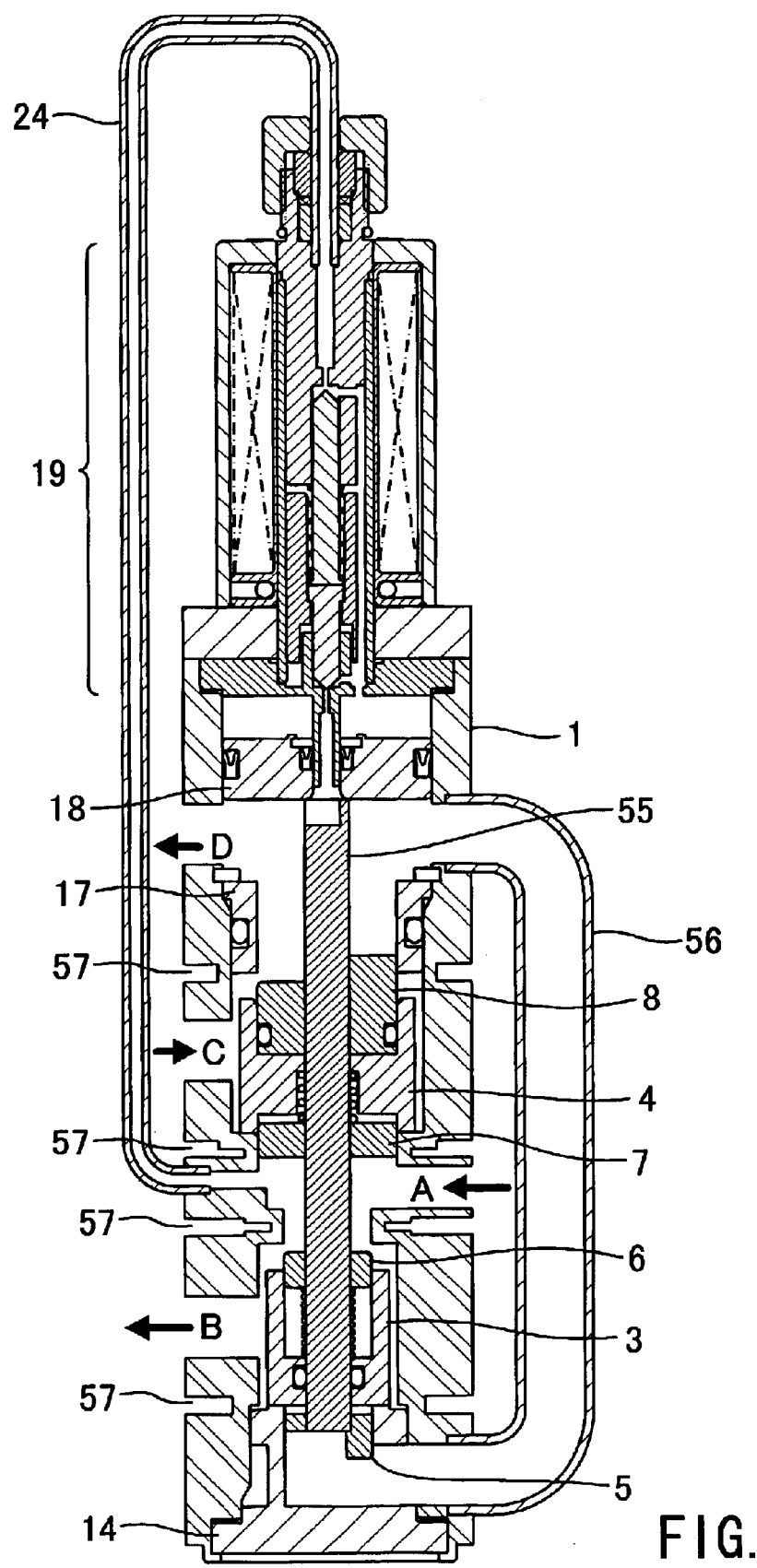
FIG. 13 is a longitudinal sectional view of a four-way switching valve according to an eighth embodiment of the invention, in a switching position taken when its solenoid is OFF.

FIG. 13 is a longitudinal sectional view of a four-way switching valve according to an eighth embodiment of the invention, in a switching position taken when its solenoid is OFF. It should be noted that in FIG. 13, component parts and elements similar or equivalent to those of the four-way switching valve shown in FIGS. 11 and 12 are designated by identical reference numerals, and detailed description thereof is omitted.

The four-way switching valve according to the eighth embodiment has the same internal construction as that according to the seventh embodiment, and operates in the same manner, but the shape of the body 1 is modified to reduce heat loss within the four-way switching valve.

More specifically, the four-way switching valve according to the eighth embodiment includes a thickness-reducing recess 57 formed by providing a cut into a portion of the body 1 between the low-pressure passage and the high-pressure passage from the outer periphery thereof. This increases the thermal resistance between the high-pressure passage through which the refrigerant at a high temperature flows and the low-pressure chamber through which the refrigerant at a low temperature flows, thereby reducing conduction of the heat from the high-pressure passage to the low-pressure passage via the body 1, which makes it possible to reduce heat loss within the four-way switching valve.

Figure 14:
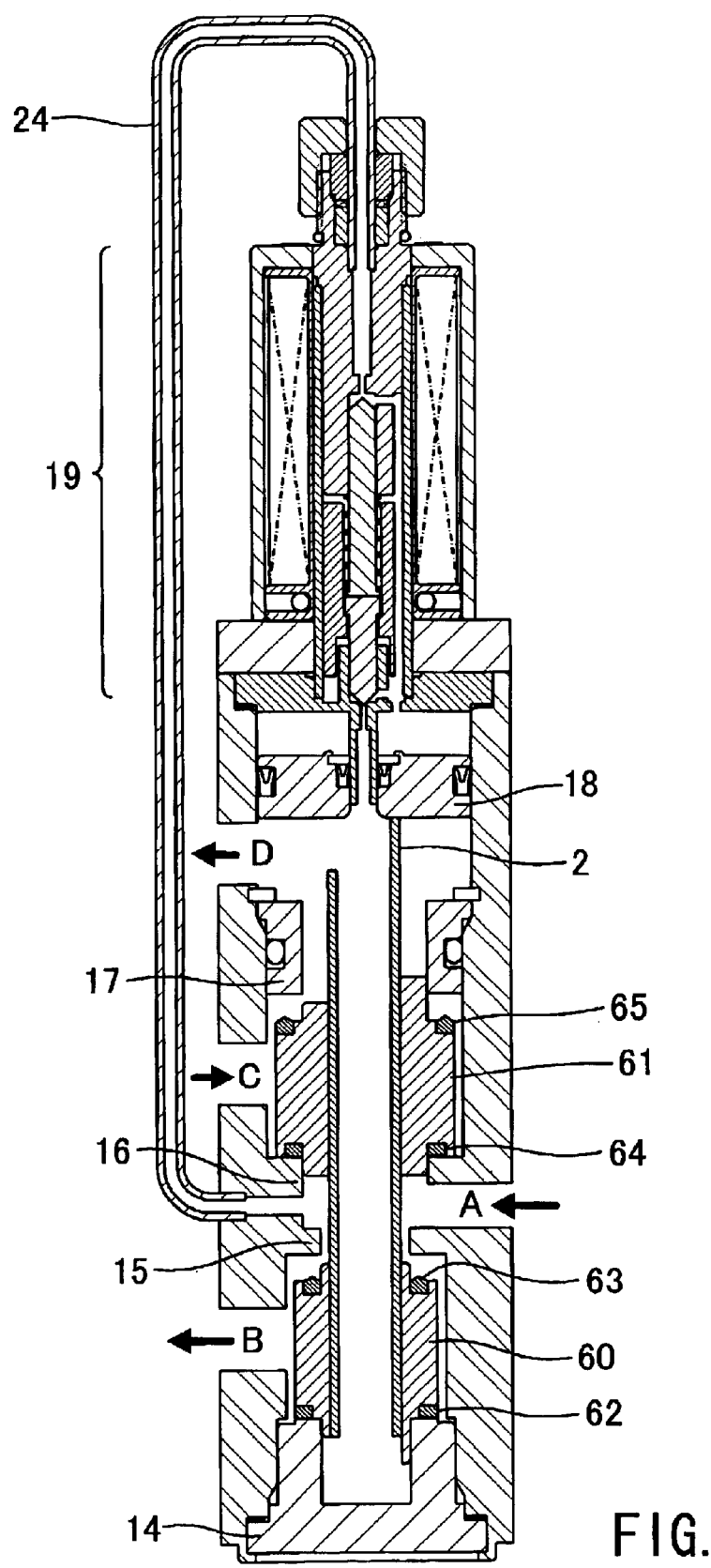
FIG. 14 is a longitudinal sectional view of a four-way switching valve according to a ninth embodiment of the invention, in a switching position taken when its solenoid is OFF.
Figure 15:
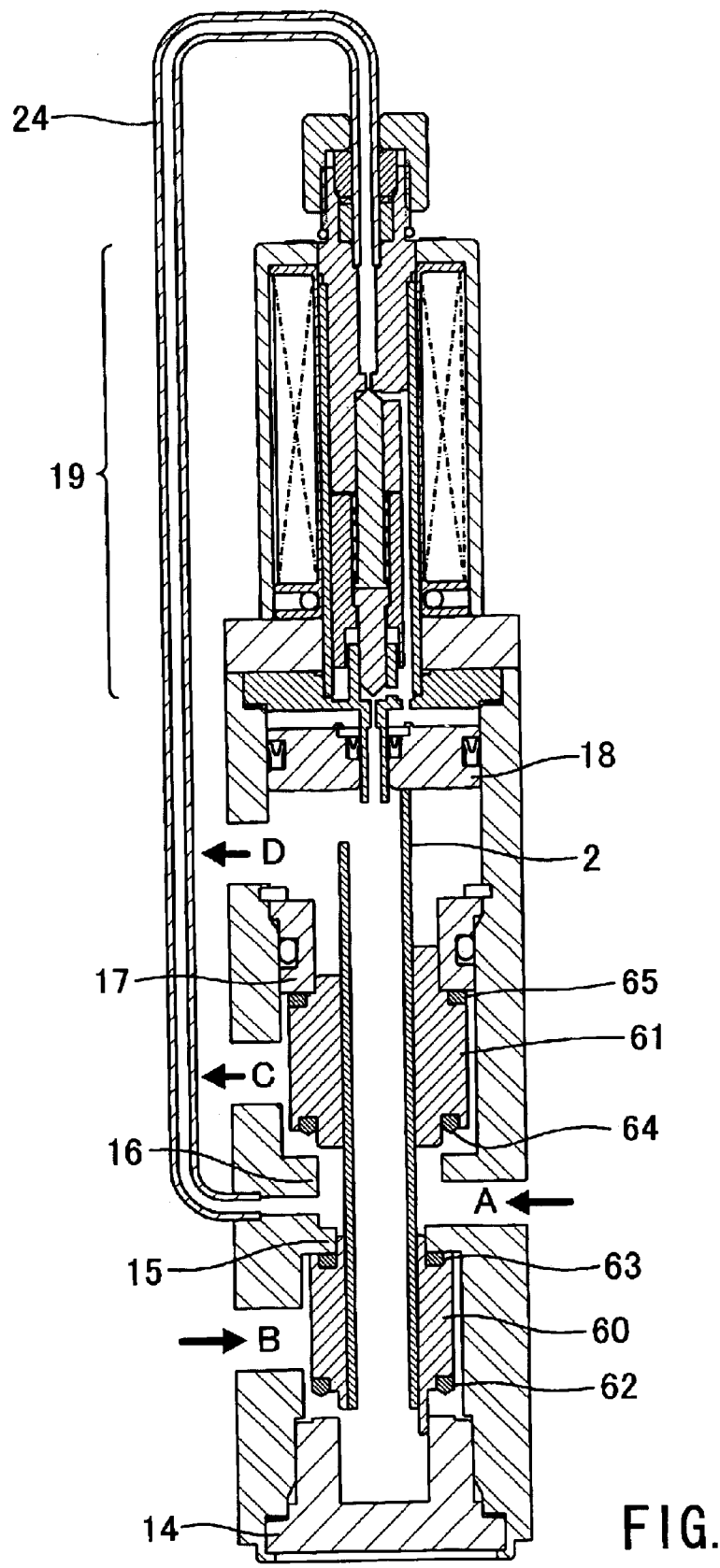

FIG. 14 is a longitudinal sectional view of a four-way switching valve according to a ninth embodiment of the invention, in a switching position taken when its solenoid is OFF. FIG. 15 is a longitudinal sectional view of the four-way switching valve according to the ninth embodiment of the invention, in a switching position taken when its solenoid is ON. It should be noted that in FIGS. 14 and 15, component parts and elements similar or equivalent to those of the four-way switching valve shown in FIG. 1 are designated by identical reference numerals, and detailed description thereof is omitted.

Compared with the four-way switching valve according to the first embodiment, the four-way switching valve according to the ninth embodiment has substantially the same internal construction, and operates in the same manner, but is distinguished therefrom in that the valve elements 3, 4 and the guides 5, 6, 7, 8 mounted on the sleeve 2 are integrally formed with each other, and seal rings newly provided for improving the sealing properties during closing of the valves are caused to have the functions of the springs 9, 10.

More specifically, in the four-way switching valve according to the ninth embodiment, plugs 60, 61 are secured to the sleeve 2, and portions of the plugs 60, 61 via which they are seated on the cap 14, the annular projections 15, 16, and the guide 17 have seal rings 62, 63, 64, 65 fitted thereon. The plugs 60, 61 have large-diameter portions which form valves together with the cap 14, the annular projections 15, 16, and the guide 17, and small-diameter portions integrally formed with the respective large-diameter portions, which protrude axially at both ends and open and close associated valve holes while guiding the axial motions of the sleeve 2 and the plugs 60, 61. The seal rings 62, 63, 64, 65 are fitted on the plugs 60, 61 such that they protrude from the seating surfaces of the plugs, and formed by a resilient material, such as rubber and polytetrafluoroethylene. This makes it possible to increase the sealing properties of each valve when closed without enhancing the machining accuracy of portions where the valve elements are seated, and when the plugs 60, 61 are seated in different timings, the one seated earlier is deformed largely to accommodate the distance over which the other one moves to be seated subsequently, by its resilience.

In the four-way switching valve constructed as above, as shown in FIG. 14, when the solenoid is OFF, the high pressure present at the port A is introduced into the pressure chamber defined on the upper side of the piston 18 via the tube 24 and the three-way solenoid valve 19, thereby pushing the piston 18 downward as viewed in the figure.

As a result, the port A is communicated with the port B, and the port C is communicated with the port D. This places the heating and cooling system for an automotive vehicle in the cooling operation mode in which the high-pressure refrigerant delivered from the compressor and received via the port A is allowed to flow from the port B to the external heat exchanger, and the refrigerant delivered from the internal heat exchanger and received via the port C is allowed to flow from the port D to the compressor.

Next, then the solenoid is turned ON, as shown in FIG. 15, the pressure chamber on the upper side of the piston 18 is switched to the low pressure by the three-way solenoid valve 19, whereby the piston 18 is deprived of the force of pushing the sleeve 2 downward as viewed in the figure, and the plug 61 secured to the sleeve 2 receives larger pressure than the plug 60 does, so that the sleeve 2 is pushed upward as viewed in the figure.

As a result, the port A is communicated with the port C, and the port B is communicated with the port D. This switches the heating and cooling system for an automotive vehicle to the heating operation mode in which the high-pressure refrigerant delivered from the compressor and received via the port A is allowed to flow from the port C to the internal heat exchanger, and the refrigerant delivered from the external heat exchanger and received via the port B is allowed to flow from the port D to the compressor.

Figure 16:
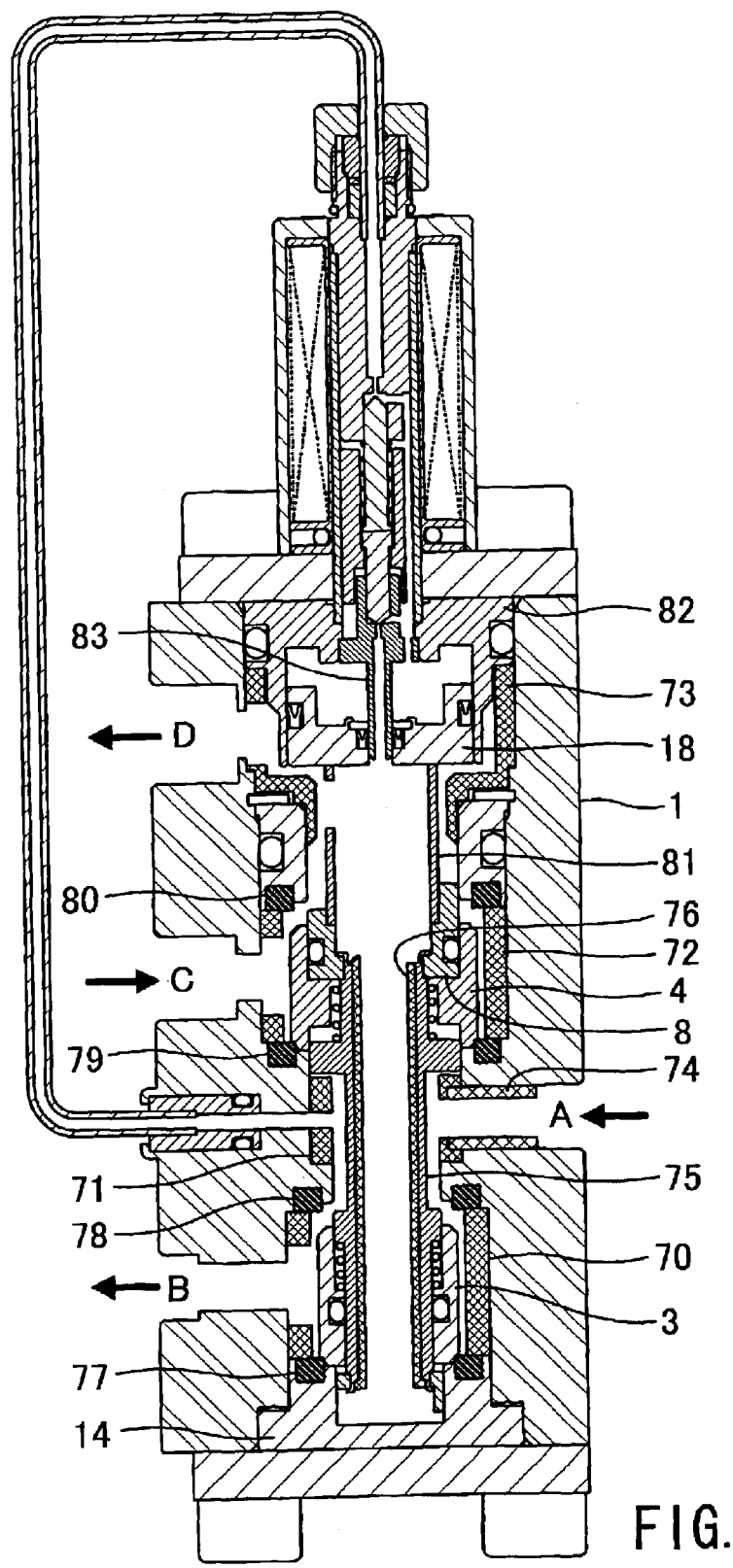
FIG. 16 is a longitudinal sectional view of a four-way switching valve according to the tenth embodiment of the invention, in a switching position taken when its solenoid is OFF.
Figure 17:
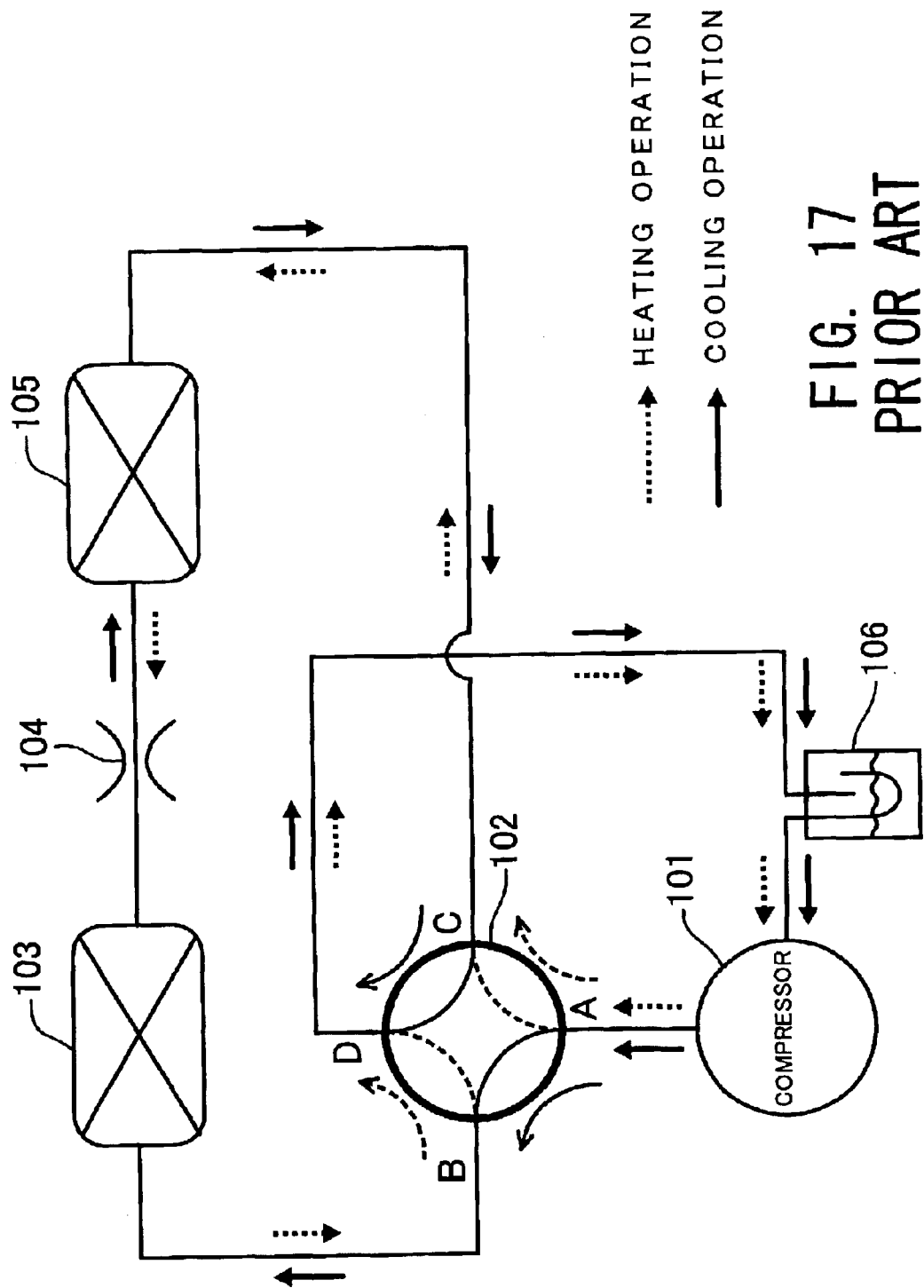
FIG. 17 is a diagram showing the arrangement of a heating and cooling system using a four-way switching valve.

FIG. 16 is a longitudinal sectional view of a four-way switching valve according to a tenth embodiment of the invention, in a switching position taken when its solenoid is OFF. It should be noted that in FIG. 16, component parts and elements similar or equivalent to those of the four-way switching valve shown in FIG. 1 are designated by identical reference numerals, and detailed description thereof is omitted.

Compared with the four-way switching valve according to the first embodiment, the four-way switching valve according to the tenth embodiment has the same internal basic construction and operates in the same way, but is distinguished therefrom in that passages through which the refrigerant passes are formed to have a heat-insulating structure, and the sealing properties of the valve element of each valve when closed are improved.

In the first place, with respect to a point of the heat-insulating structure of passages through which the refrigerant passes, a plurality of resin sleeves 70, 71, 72, 73 are fitted on the inner walls of the body 1 in a manner divided according to the inner diameters of the passages, and a resin sleeve 74 is also arranged in a refrigerant passage of the port A. Further, a driving rod 75 in the form of a hollow cylinder which is integrally formed with a guide, for holding the valve elements 3, 4 also has a resin sleeve 76 arranged in a central refrigerant passage extending therethrough. Thus, the refrigerant passages through which the refrigerant passes are made heat-insulating, it is possible to suppress conduction of heat via the body 1. When the body 1 is made of a material excellent in thermal conductivity such as an aluminum, the above configuration is effective for reduction of heat loss in the four-way switching valve. The resin sleeves 70, 71, 72, 73, 74 can be made e.g. of a polyphenylene sulfide resin.

Next, with respect to the improved sealing properties exhibited when each valve is closed, seal rings 77, 78, 79, 80 having resilient properties and a rectangular cross-sectional shape are fitted on the cap 14, the annular projections 15, 16, and the guide 17. Due to this configuration, the seal rings 77, 78, 79, 80 are deformed by pressure when the valve elements 3, 4 are seated to air-tightly close between the valve elements 3, 4 and their associated valve seats. This makes it possible to improve the sealing properties of each valve when closed without enhancing the machining accuracy of portions where the valve elements are seated. The seal rings 77, 78, 79, 80 can be made e.g. of rubber, polytetrafluoroethylene, or a like material.

It should be noted that the driving rod 75 has the guide 8 secured to an upper end thereof by caulking, and the sleeve 81 is press fitted in a central opening of the guide 8 to be secured thereto. The sleeve 81 has one end thereof open, allowing communication with the space at the port D.

Further, although in the four-way switching valve according to the first embodiment, the upper end of the body 1 is closed by the cap 27 which is integrally formed with the valve seat for the needle valve for opening and closing the communication between the pressure chamber on the upper side of the piston 18 and the space at the port D and the refrigerant passage extending axially along the piston 18, in the present embodiment, they are divided into separate two components. More specifically, the opening at the upper end of the body 1 is closed by a cap 82, and a hollow cylindrical hanging portion is formed around the cap 82 for receiving the piston 18 therein. Fitted to the central portion of the cap 82 is an upper end portion of a low-pressure communicating member 83 having a valve hole and a refrigerant passage extending axially therethrough, while a lower end portion of the same air-tightly extends through the center of the piston 18.

The present invention has been described in detail heretofore based on preferred embodiments thereof. However, the present invention is by no means limited to these embodiments. For example, although in the first to tenth embodiments, the port D under low pressure arranged axially outward of the two three-way switching valves is communicated by the hollow cylindrical tube 2 or the tube 56 arranged outside the body, the same may be communicated by a longitudinal passage formed through the body 1 such that the openings of the ports A to D are avoided.

As described heretofore, the four-way switching valve according to the present invention is configured such that the two three-way switching valves and the piston for actuating these valves are coaxially arranged within the hollow cylindrical body. This makes the whole construction of the valve simple and compact in size, and what is more, the body can be machined only by uniaxial machining, which makes it possible to reduce the manufacturing costs.

Further, the valve elements of the two three-way switching valves are prevented from being seated simultaneously by accommodating the distance over which one of the valve elements seated earlier moves to allow the other one to be seated subsequently, by springs or sealing members made of a resilient material. This makes it possible to prevent the valves from being defective in sealing when they are closed, depending on the machining accuracy of components, tolerance of assembly, and difference in thermal expansions.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A four-way switching valve for switching between a first state in which a fluid introduced into a first port is guided to a second port to allow the same to flow out therefrom and the fluid introduced into a third port is guided to a fourth port to allow the same to flow out therefrom, and a second state in which the fluid introduced into the first port is guided to the third port to allow the same to flow out therefrom and the fluid introduced into the second port is guided to the fourth port to allow the same to flow out therefrom, the four-way switching valve comprising:

a first three-way switching valve for carrying out a switching operation to cause the second port to communicate with the first port or the fourth port;

a second three-way switching valve for carrying out a switching operation in unison with the first three-way switching valve to cause the third port to communicate with the fourth port or the first port; and a piston for simultaneously actuating a valve element of the first three-way switching valve and a valve element of the second three-way switching valve, the first three-way switching valve, the second three-way switching valve, and the piston being coaxially arranged within a hollow cylindrical body, wherein the first three-way switching valve and the second three-way switching valve each comprises the valve element axially slidably arranged on a driving rod axially arranged, for opening and closing valve holes formed at openings of passages which are arranged on axially both sides of the valve element and communicated with the first port and the fourth port, guides each fixed to the driving rod and axially protruding outward from axially opposite seating surfaces of the valve element via which the valve element is seated, for being inserted into the valve hole to close the valve hole before the valve element is seated, and at the same time for limiting an axially slidable range of the valve element, and a spring for urging the valve elements in such a direction that the valve element is brought into abutment with an axially outwardly arranged one of the guides.

2. The four-way switching valve according to claim 1, wherein a high-pressure space communicating with the first port is arranged between the first three-way switching valve and the second three-way switching valve, and wherein a low-pressure space communicating with the fourth port is arranged on an axially outer side of the driving rod, and wherein spaces accommodating the valve elements of the first three-way switching valve and the second three-way switching valve are communicated with the second port and the third port, respectively.

3. The four-way switching valve according to claim 2, wherein the driving rod is formed by a hollow cylindrical sleeve to thereby communicate spaces arranged on axially outer sides thereof with the fourth port.

4. The four-way switching valve according to claim 2, wherein spaces arranged on axially outer sides of the driving rod are communicated with each other by tubing or by a passage formed in the body to thereby communicate the spaces with the fourth port.

5. The four-way switching valve according to claim 2, including a three-way solenoid valve for selectively communicating a pressure chamber arranged on a side of the piston opposite to a side thereof where the first three-way switching valve and the second three-way switching valve are arranged, with the first port or the fourth port, thereby, when the pressure chamber is communicated with the first port, causing the first three-way switching valve and the second three-way switching valve to be actuated in a first direction in which the piston moves to switch the four-way switching valve to the first state.

6. The four-way switching valve according to claim 5, wherein one of the first three-way switching valve and the second three-way switching valve which is arranged on a side closer to the piston is configured to have a larger pressure-receiving area than a pressure-receiving area of the other, whereby when the three-way solenoid valve causes the pressure chamber to be communicated with the fourth port, the piston is actuated in a second direction opposite to the first direction by a driving force generated due to a difference in the pressure-receiving areas, thereby switching the first three-way switching valve and the second three-way switching valve to the second state.

7. The four-way switching valve according to claim 5, including a spring for actuating the first three-way switching valve, the second three-way switching valve, and the piston in a second direction opposite to the first direction, to thereby switch the first three-way switching valve and the second three-way switching valve to the second state, when the three-way solenoid valve causes the pressure chamber to be communicated with the fourth port.

8. The four-way switching valve according to claim 5, including a second piston arranged on a side of the first three-way switching valve and the second three-way switching valve opposite to a side thereof where the piston is arranged, for actuating the first three-way switching valve and the second three-way switching valve in a second direction opposite to the first direction, and a second three-way solenoid valve for selectively communicating a second pressure chamber arranged on a side of the second piston opposite to a side thereof where the first three-way switching valve and the second three-way switching valve are arranged, with the first port or the fourth port, thereby, when the second pressure chamber is communicated with the first port, causing the second piston to actuate the first three-way switching valve and the second three-way switching valve in the second direction to switch the four-way switching valve to the second state.

9. The four-way switching valve according to claim 2, including a first pressure chamber and a second pressure chamber on axially both sides of the piston, and a three-way solenoid valve for selectively communicating the first port with the first pressure chamber or the second pressure chamber to thereby selectively introduce the fluid introduced into the first port into the first pressure chamber or the second pressure chamber, whereby the piston axially actuates the first three-way switching valve and the second three-way switching valve to switch the first three-way switching valve and the second three-way switching valve to the first state or the second state.

10. The four-way switching valve according to claim 9, wherein the piston includes a first opening/closing valve for opening and closing a first orifice provided between the first pressure chamber and a low-pressure passage communicating with the fourth port, and a second opening/closing valve for opening and closing a second orifice provided between the second pressure chamber and the low-pressure passage, and wherein the first opening/closing valve and the second opening/closing valve are arranged such that the first opening/closing valve closes when pressure in the first pressure chamber is high, and the second opening/closing valve opens in a manner interlocked with the closing operation of the first opening/closing valve, and that the second opening/closing valve closes when pressure in the second pressure chamber is high and the first opening/closing valve opens in a manner interlocked with the closing operation of the second opening/closing valve.

11. The four-way switching valve according to claim 8, wherein the piston has a first orifice provided between the first pressure chamber and a low-pressure passage communicating with the fourth port, and a second orifice provided in a member separating the second pressure chamber and the low-pressure passage from each other.

12. The four-way switching valve according to claim 1, wherein the first three-way switching valve and the second three-way switching valve have sealing members arranged at portions where the valve elements are seated, in an interposed manner.

13. The four-way switching valve according to claim 1, wherein the hollow cylindrical body accommodating the first three-way switching valve and the second three-way switching valve has a double structure in which an inner part thereof is formed by a resin body and an outer part thereof is formed by a metal body.

14. The four-way switching valve according to claim 1, wherein the hollow cylindrical body accommodating the first, three-way switching valve and the second three-way switching valve has a thickness-reducing portion provided between a low-pressure passage and a high-pressure passage to thereby suppress heat conduction therebetween.

15. A four-way switching valve for switching between a first state in which a fluid introduced into a first port is guided to a second port to allow the same to flow out therefrom and the fluid introduced into a third port is guided to a fourth port to allow the same to flow out therefrom, and a second state in which the fluid introduced into the first port is guided to the third port to allow the same to flow out therefrom and the fluid introduced into the second port is guided to the fourth port to allow the same to flow out therefrom, the four-way switching valve comprising:

a first three-way switching valve for carrying out a switching operation to cause the second port to communicate with the first port or the fourth port;

a second three-way switching valve for carrying out a switching operation in unison with the first three-way switching valve to cause the third port to communicate with the fourth port or the first port;

a piston for simultaneously actuating a valve element of the first three-way switching valve and a valve element of the second three-way switching valve;

a hollow cylindrical body having the first three-way switching valve, the second three-way switching valve, and the piston being coaxially arranged therein in this sequence; and a three-way solenoid valve for selectively communicating a pressure chamber arranged on a side of the piston opposite to a side thereof where the first three-way switching valve is arranged, with the first port or the fourth port, thereby, when the pressure chamber is communicated with the first port, causing the first three-way switching valve and the second three-way switching valve to be actuated in a first direction in which the piston moves to switch the four-way switching valve to the first state, wherein the first three-way switching valve and the second three-way switching valve each comprise the valve element fixed to a driving rod axially arranged, for opening and closing valve holes formed at openings of passages which are arranged on axially both sides of the valve element and communicated with the first port and the fourth port, guides each fixed to the driving rod and axially protruding outward from axially opposite seating surfaces of the valve element via which the valve element is seated, for being inserted into the valve hole to close the valve hole before the valve element is seated, and resilient sealing members arranged at portions where the valve element is seated, and wherein the second three-way switching valve is configured to have a larger pressure-receiving area than a pressure-receiving area of the first three-way switching valve, whereby when the three-way solenoid valve causes the pressure chamber to be communicated with the fourth port, the piston is actuated in a second direction opposite to the first direction by a driving force generated due to a difference in the pressure-receiving areas, thereby switching the first three-way switching valve and the second three-way switching valve to the second state.

16. The four-way switching valve according to claim 15, wherein the valve elements and the guides of the first three-way switching valve and the second three-way switching valve are integrally formed with each other.

17. The four-way switching valve according to claim 15, wherein the hollow cylindrical body accommodating the first three-way switching valve and the second three-way switching valve has a double structure in which an inner part thereof is formed by a resin body and an outer part thereof is formed by a metal body.

18. The four-way switching valve according to claim 15, wherein the hollow cylindrical body accommodating the first three-way switching valve and the second three-way switching valve has a thickness-reducing portion provided between a low-pressure passage and a high-pressure passage to thereby suppress heat conduction therebetween.

* * * * *

UNITED STATES PATENT AND TRADEMARK OFFICE
CERTIFICATE OF CORRECTION

PATENT NO.    : 6,810,911 B2
DATED         : November 2, 2004
INVENTOR(S)   : Hirota It is certified that error appears in the above-identified patent and that said Letters Patent is hereby corrected as shown below:

Title page,
Item [73], Assignee, delete "Inc." and insert -- Ltd. --.

Signed and Sealed this

Tenth Day of May, 2005

JON W. DUDAS
*Director of the United States Patent and Trademark Office*